(12) United States Patent
Fazlali et al.

(10) Patent No.: US 12,315,226 B2
(45) Date of Patent: May 27, 2025

(54) SYSTEM AND METHOD FOR 3D OBJECT DETECTION USING MULTI-RESOLUTION FEATURES RECOVERY USING PANOPTIC SEGMENTATION INFORMATION

(71) Applicants: Hamidreza Fazlali, Hamilton (CA); Richard Xu, Newmarket (CA); Bingbing Liu, Beijing (CN)

(72) Inventors: Hamidreza Fazlali, Hamilton (CA); Richard Xu, Newmarket (CA); Bingbing Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 467 days.

(21) Appl. No.: 17/871,877

(22) Filed: Jul. 22, 2022

(65) Prior Publication Data
US 2023/0281961 A1    Sep. 7, 2023

Related U.S. Application Data

(60) Provisional application No. 63/317,360, filed on Mar. 7, 2022.

(51) Int. Cl.
| | | |
|---|---|---|
| *G06V 10/77* | (2022.01) | |
| *G06V 10/771* | (2022.01) | |
| *G06V 10/82* | (2022.01) | |

(52) U.S. Cl.
CPC ........ *G06V 10/7715* (2022.01); *G06V 10/771* (2022.01); *G06V 10/82* (2022.01); *G06V 2201/07* (2022.01)

(58) Field of Classification Search
CPC .. G06V 10/7715; G06V 10/771; G06V 10/82; G06V 2201/07; G06V 20/56; G06V 10/454; G06V 10/764; G06V 20/64

USPC .......................................................... 382/103
See application file for complete search history.

(56) References Cited

U.S. PATENT DOCUMENTS

| | | | |
|---|---|---|---|
| 11,527,085 B1 * | 12/2022 | Widjaja ................. | H04N 23/80 |
| 2022/0180548 A1 * | 6/2022 | Li ............................ | G06T 7/10 |
| 2023/0035475 A1 * | 2/2023 | Cheng .................. | G01S 17/931 |

OTHER PUBLICATIONS

Bin Yang, Wenjie Lou and Raquel Urtasun, "PIXOR: Real-time 3D Object Detection from Point Clouds", CVPR 2018, arXiv:1902.06326 Mar. 2, 2019.
Martin Simon, Stefan Milz, Karl Amende, Horst-Michael Gross, "Complex-YOLO: Real-time 3D Object Detection on Point Clouds", arXiv: 1803.06199 Sep. 24, 2018.
Yin Zhou and Oncel Tuzel, "VoxelNet: End-to-End Learning for Point Cloud Based 3D Object Detection", CVPR 2018, arXiv:1711.06396 Nov. 17, 2017.

(Continued)

*Primary Examiner* — Jerome Grant, II

(57) ABSTRACT

A system and method for 3D object detection using multi-resolution features recovery using panoptic segmentation information. Panoptic segmentation predictions from a panoptic segmentation network and intermediate feature maps from one or more early layers of an object detection network are received. Feature vectors are retrieved from the intermediate feature maps using the panoptic segmentation predictions. The retrieved feature vectors are combined with feature maps from one or more late layers of the object detection network for generating object detection predictions.

20 Claims, 20 Drawing Sheets
(18 of 20 Drawing Sheet(s) Filed in Color)

(56) References Cited

OTHER PUBLICATIONS

Alex H. Lang, Sourabh Vora, Holger Caesar, Lubing Zhou, Jiong Yang, Oscar Beijbom, "PointPillars: Fast Encoders for Object Detection from Point Clouds", CVPR 2019, arXiv:1812.05784 May 7, 2019.
Yan Yan, Yuxing Mao and Bo Li, "SECOND: Sparsely Embedded Convolutional Detection", Sensors 2018, https://doi.org/10.3390/s18103337 Aug. 20, 2018.
Tianwei Yin, Xingyi Zhou, Philipp Krähenbühl, "Center-based 3D object detection and tracking", CVPR 2021, arXiv:2006.11275 Jan. 6, 2021.
Enxu Li, Ryan Razani, Yixuan Xu, Liu Bingbing, "SMAC-Seg: LiDAR Panoptic Segmentation via Sparse Multi-directional Attention Clustering", ICRA 2022, arXiv:2108.13588 Aug. 31, 2021.
Enxu Li, Ryan Razani, Yixuan Xu, Bingbing Liu, "CPSeg: Cluster-free Panoptic Segmentation of 3D LiDAR Point Clouds", arXiv:2111.01723 Nov. 2, 2021.
Holger Caesar, Varun Bankiti, Alex H. Lang, Sourabh Vora, Venice Erin Liong, Qiang Xu, Anush Krishnan, Yu Pan, Giancarlo Baldan and Oscar Beijbom, "nuScenes: A Multimodal Dataset for Autonomous Driving", CVPR 2020, arXiv:1903.11027 May 3, 2020.
Behley, J., Garbade, M., Milioto, A., Quenzel, J., Behnke, S., Stachniss, C., Gall, J.: Semantickitti: A dataset for semantic scene understanding of lidar sequences. In: Proceedings of the IEEE/CVF International Conference on Computer Vision, pp. 9297-9307 2019.
Bewley, A., Sun, P., Mensink, T., Anguelov, D., Sminchisescu, C.: Range conditioned dilated convolutions for scale invariant 3d object detection. arXiv preprint arXiv:2005.09927 2020.
Campello, R.J.G.B., Moulavi, D., Sander, J.: Density-based clustering based on hierarchical density estimates. Advances in Knowledge Discovery and Data Mining Lecture Notes in Computer Science p. 160-172 2013.
Chen, Q., Sun, L., Wang, Z., Jia, K., Yuille, A.: Object as hotspots: An Anchor-Free 3D object detection approach via firing of hotspots. In: European conference on computer vision, pp. 68-84. Springer 2020.
Chen, S., Xie, E., Ge, C., Liang, D., Luo, P.: Cyclemlp: A mlp-like architecture for dense prediction. arXiv preprint arXiv:2107.10224 2021.
Dosovitskiy, A., Beyer, L., Kolesnikov, A., Weissenborn, D., Zhai, X., Lhiterthiner, T., Dehghani, M., Minderer, M., Heigold, G., Geliy, S., et al.: An image is worth 16×16 words: Transformers for image recognition at scale. arXiv preprint arXiv:2010.11929 2020.
Fazlali, FL, Xu, Y., Ren, Y., Liu, B .: A versatile multi-view framework for lidar-based 3d object detection with guidance from panoptic segmentation. In: arXiv:2203.02133v1 2022.
He, K., Gkioxari, G., Dollar, P., Girshick, R.: Mask r-cnn. In: Proceedings of the IEEE international conference on computer vision, pp. 2961-2969 2017.
He, K., Zhang, X., Ren, S., Sun, J.: Deep residual learning for image recognition. In: Proceedings of the IEEE conference on computer vision and pattern recognition, pp. 770-778 2016.
Hurtado, J.V., Mohan, R., Burgard, W., Valada, A.: Mopt: Multi-object panoptic tracking. arXiv preprint arXiv:2004.08189 2020.
Kirillov, A., He, K., Girshick, R., Rother, C., Dollar, P.: Panoptic segmentation. 2019 IEEE/CVF Conference on Computer Vision and Pattern Recognition (CVPR). https://doi.org/10.1109/cvpr.2019.00963 2019.
Li, J., Hassani, A., Walton, S., Shi, H.: ConvMLP: Hierarchical convolutional MLPs for vision. arXiv preprint arXiv:2109.04454 2021.
Melas-Kyriazi, L.: Do you even need attention? A stack of feed-forward layers does surprisingly well on imagenet. arXiv preprint arXiv:2105.02723 2021.
Milioto, A., Behley, J., McCool, C., Stachniss, C.: Lidar panoptic segmentation for autonomous driving. In: 2020 IEEE/RSJ International Conference on Intelligent Robots and Systems (IROS). pp. 8505-8512. IEEE 2020.
Ngiam, J., Caine, B., Han, W., Yang, B., Chai, Y., Sun, P., Zhou, Y., Yi, X., Alsharif, O., Nguyen, P., et ah: Starnet: Targeted computation for object detection in point clouds. arXiv preprint arXiv: 1908.11069 2019.
Paszke, A., Gross, S., Massa, F., Lerer, A., Bradbury, J., Chanan, G., Killeen, T., Lin, Z., Gimelshein, N., Antiga, L., et al.: PyTorch: An imperative style, high-performance deep learning library. Advances in neural information processing systems 32, 8026-8037 2019.
Qi, C.R., Liu, W., Wu, C., Su, H., Guibas, L.J.: Frustum PointNets for 3D object detection from RGB-D data. In: Proceedings of the IEEE conference on computer vision and pattern recognition, pp. 918-927 2018.
Qi, C.R., Su, H., Mo, K., Guibas, L.J.: PointNet: Deep learning on point sets for 3D classification and segmentation. In: Proceedings of the IEEE conference on computer vision and pattern recognition, pp. 652-660 2017.
Qi, C.R., Yi, L., Su, H., Guibas, L.J.: PointNet++: Deep hierarchical feature learning on point sets in a metric space. Advances in neural information processing systems 2017.
Razani, R., Cheng, R., Li, E., Taghavi, E., Ren, Y., Bingbing, L .: GP-S3net: Graph-based panoptic sparse semantic segmentation network. In: Proceedings of the IEEE/CVF International Conference on Computer Vision, pp. 16076-16085 2021.
Shi, S., Guo, C., Jiang, L., Wang, Z., Shi, J., Wang, X., Li, H.: PV-RCNN: Point-voxel feature set abstraction for 3D object detection. In: Proceedings of the IEEE/CVF Conference on Computer Vision and Pattern Recognition, pp. 10529-10538 2020.
Shi, S., Wang, X., Li, H.: PointRCNN: 3D object proposal generation and detection from point cloud. In: Proceedings of the IEEE/CVF conference on computer vision and pattern recognition, pp. 770-779 2019.
Sirohi, K., Mohan, R., Buscher, D., Burgard, W., Valada, A.: EfficientLPS: Efficient LiDAR panoptic segmentation. IEEE Transactions on Robotics 2021.
Team, O.D.: Openpcdet: An open-source toolbox for 3d object detection from point clouds. https://github.com/open- mmlab/OpenPCDet 2020.
Tolstikhin, I.O., Houlsby, N., Kolesnikov, A., Beyer, L., Zhai, X., Unterthiner, T., Yung, J., Steiner, A., Keysers, D., Uszkoreit, J., et al.: MLP-mixer: An all-MLP architecture for vision. Advances in Neural Information Processing Systems 2021.
Touvron, H., Bojanowski, R, Caron, M., Cord, M., El-Nouby, A., Grave, E., Izacard, G., Joulin, A., Synnaeve, G., Verbeek, J., et al.: ResMLP: Feedforward networks for image classification with data-efficient training. arXiv preprint arXiv:2105.03404 2021.
Touvron, H., Cord, M., Douze, M., Massa, F., Sablayrolles, A., Jegou, H.: Training data-efficient image transformers & distillation through attention. In: International Conference on Machine Learning, pp. 10347-10357. PMLR 2021.
Wang, W., Xie, E., Li, X., Fan, D.P., Song, K., Liang, D., Lu, T., Luo, R, Shao, L.: Pyramid vision transformer: A versatile backbone for dense prediction without convolutions. In: Proceedings of the IEEE/CVF International Conference on Computer Vision, pp. 568-578 2021.
Woo, S., Park, J., Lee, J.Y., Kweon, In So: CBAM: Convolutional block attention module. In: Proceedings of the European conference on computer vision (ECCV). pp. 3-19 2018.

\* cited by examiner

Center Density Map       Instance Masks

| Method | NDS | mAP | Proposed Module Inference Time (ms) |
|---|---|---|---|
| Single-Stage CenterPoint | 64.80 | 56.4 | - |
| Multi-task Baseline | 67.14 | 60.86 | - |
| Example Embodiment 1 | 67.88 | 60.86 | 16 |
| Example Embodiment 2 | 68.15 | 60.41 | 75 |
| Example Embodiment 3 | 68.48 | 61.42 | 71 |

FIG. 18

| Method | NDS | mAP | Proposed Module Inference Time (ms) |
|---|---|---|---|
| SECOND | 62.73 | 51.84 | - |
| Example Embodiment 3 | 65.70 | 58.21 | 71 |

FIG. 19

| Method | NDS | mAP | Proposed Module Inference Time (ms) |
|---|---|---|---|
| PointPillars | 58.05 | 44.59 | - |
| Example Embodiment 3 | 64.01 | 54.46 | 71 |

FIG. 20

SYSTEM AND METHOD FOR 3D OBJECT DETECTION USING MULTI-RESOLUTION FEATURES RECOVERY USING PANOPTIC SEGMENTATION INFORMATION

RELATED APPLICATION DATA

The present application claims priority to, and the benefit of, provisional U.S. patent application No. 63/317,360, filed Mar. 7, 2022, the content of which is incorporated herein by reference.

TECHNICAL FIELD

The present disclosure is generally related to perception systems for autonomous driving vehicles, and in particular, to a system and method for three-dimensional (3D) object detection using multi-resolution features recovery using panoptic segmentation information.

BACKGROUND

Conventional 3D object detection methods receive information regarding 3D point clouds captured by LiDAR sensors, including the Cartesian coordinates and reflectance information that describe scene or environment sensed by the LiDAR sensors. A 3D point cloud is a set of data points in a 3D coordinate system, wherein each data point in the point cloud has three coordinates (x, y, and z) which determine where the point is located along x, y, and z axes of the 3D coordinate system. To be computationally efficient, 3D object detection methods are typically grid-based methods that have a "voxelization module" which partitions unordered point cloud into regular 3D volumetric grid cells known as voxels and extract features from the points sampled inside each 3D volumetric grid cell. Early methods encode each voxel with hand-crafted features (i.e., features that are calculated based on the coordinate and reflectance information from the LiDAR dataset). PIXOR, for example, encodes each voxel based on the occupancy and reflectance of points inside it as described by Bin Yang, Wenjie Luo and Raquel Urtasun in "*PIXOR: Real-time 3D Object Detection from Point Clouds*", CVPR 2018, arXiv: 1902.06326, Mar. 2, 2019. Complex-POLO encodes each grid cell with the maximum height, maximum intensity, and normalized point density as described by Martin Simon, Stefan Milz, Karl Amende, Horst-Michael Gross in "*Complex-YOLO: Real-time 3D Object Detection on Point Clouds*", arXiv: 1803.06199, Sep. 24, 2018. VoxelNet, on the other hand, uses a stack of voxel feature encoder (VFE) layers (inside a "Feature Learning Network" in FIG. 1) that extracts features from each voxel, producing 3D feature maps as described by Yin Zhou and Oncel Tuzel in "*VoxelNet: End-to-End Learning for Point Cloud Based 3D Object Detection*", CVPR 2018, arXiv: 1711.06396, Nov. 17, 2017. PointPillars, shown in FIG. 2, is similar to VoxelNet but reduces the number of voxels to one along the height dimension, forming pillars as described by Alex H. Lang, Sourabh Vora, Holger Caesar, Lubing Zhou, Jiong Yang and Oscar Beijbom in "*PointPillars: Fast Encoders for Object Detection from Point Clouds*", CVPR 2019, arXiv: 1812.05784, May 7, 2019. PointPillars extracts features from each pillar via a neural network (labeled as "Pillar Feature Net" in FIG. 2) and generates 2D feature maps.

After encoding the features for each voxel or pillar, the 3D or 2D feature maps are coarse representation that summarizes the scene. The feature maps can be further processed by a 3D convolutional neural network (CNN), a 2D CNN, or a combination of both for feature learning across the scene, an example of which is the SECOND neural network, described by Yan Yan, Yuxing Mao and Bo Li in "*SECOND: Sparsely Embedded Convolutional Detection*", Sensors 2018, Aug. 20, 2018 (hereinafter "SECOND"). As shown in FIG. 3, in SECOND, after voxel feature encoder layers, a series of normal sparse convolution layers and sub-manifold convolution layers (collectively labeled as "Sparse Cony Layers" in FIG. 3) are applied to the 3D feature maps to efficiently extract features across occupied voxels as In PointPillars, a 2D CNN is applied to the 2D feature maps from pillar feature extraction. In CenterPoint described by Tianwei Yin, Xingyi Zhou, Philipp Krähenbühl in "*Center-based 3D object detection and tracking*", CVPR 2021, arXiv: 2006.11275, Jan. 6, 2021 (hereinafter "CenterPoint"), a 3D CNN is first applied to 3D feature maps. The resulting 3D feature maps are then mapped to Bird's Eye View (BEV) plane by reshaping the feature maps to remove the height dimension, producing a set of 2D feature maps. These 2D feature maps are further processed by a 2D CNN.

Finally, after feature extraction across the scene, the learned feature maps are fed to an object detection head that performs object detection, a deep neural network that estimates the class label and estimated box parameters for each detected object. For example, CenterPoint (as shown in FIG. 4) uses CenterHead as its object detection head (labeled as "Head" in FIG. 4). For each object class, the model estimates a center heat map, where the values represent the confidence score for the presence of object centers. The locations for each local-maxima on the center heat map and the estimated box parameters at those locations are then used to generate the initial detection predictions. Specifically, for CenterPoint, there is also an additional stage to refine the initial detection predictions. During this stage, the network considers the local-maxima and the four sides of each predicted bounding box from the initial detection predictions, further processes features associated with these locations, and refines the estimated box parameters.

There remains a need for improved 3D object detection network to provide better accuracy and/or other improvements in 3D object detection.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 18 is a table illustrating quantitative evaluation results for the example embodiments using CenterPoint as the 3D object detection network.

FIG. 19 is a table illustrating quantitative evaluation results for an example embodiment using SECOND as the 3D object detection network.

FIG. 20 is a table illustrating quantitative evaluation results for an example embodiment using PointPillars as the 3D object detection network.

SUMMARY

The present disclosure provides a system and method for 3D object detection using multi-resolution features recovery using panoptic segmentation information, a perception module for use in the system, and a non-transitory machine-readable medium for causing devices to perform the methods described herein. The system and method may be based on a 3D point cloud, such as a LiDAR-based or LiDAR generated 3D point cloud. The perception module may be included in a computer vision system (or perception system) of a fully or partially autonomous driving vehicle. The system and method of the present disclosure aims to improve the performance of perception system for autonomous driving. More specifically, the system and method aim to improve LiDAR-based 3D object detection (later referred to as 3D object detection). The inputs are 3D point clouds captured by LiDAR sensors and the outputs are detected 3D objects including their class labels (e.g., vehicle, pedestrian, bicycle, truck, etc.) and estimated box parameters of the predicted bounding box (e.g., confidence score, 3D box center location, 3D dimension, velocity, and yaw angle).

Figure 1:
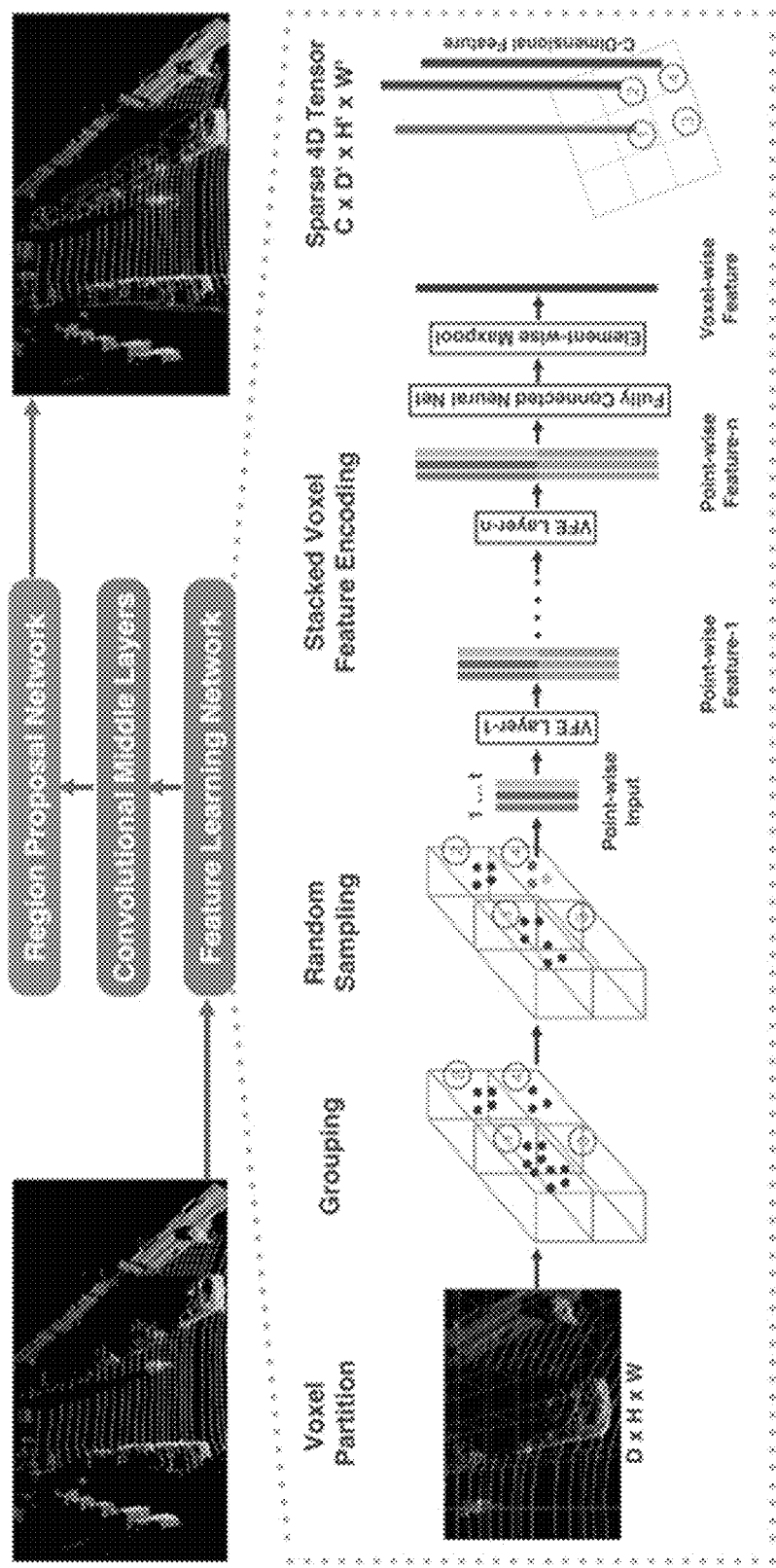
FIG. 1 is a schematic diagram showing the architecture of the VoxelNet object detection network.
Figure 2:
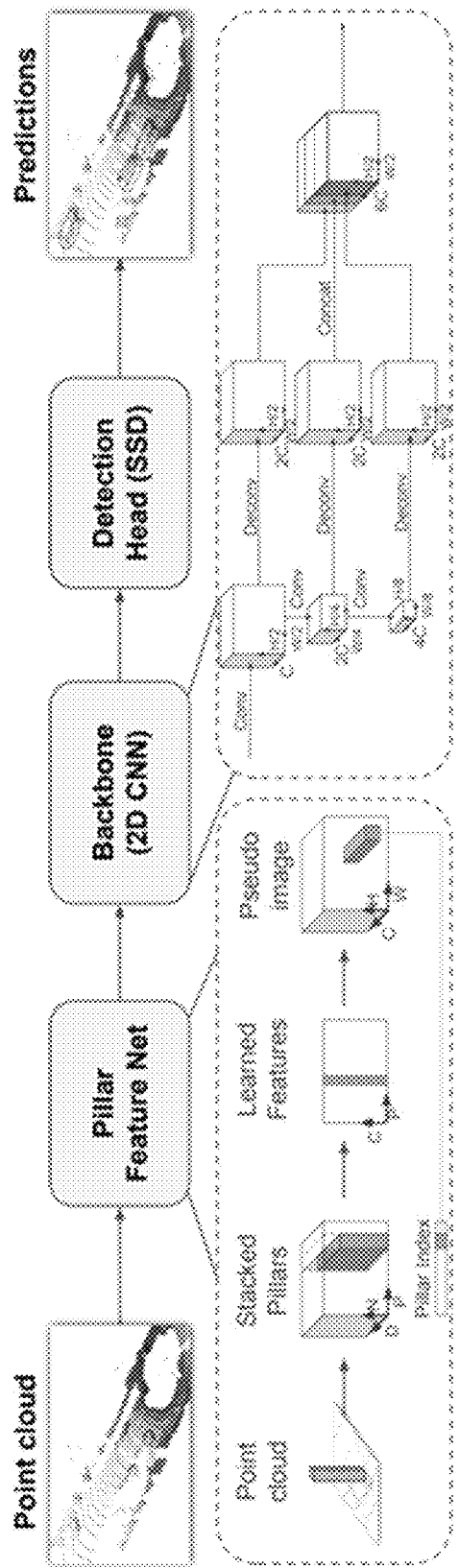
FIG. 2 is a schematic diagram showing the architecture of the PointPillars object detection network.
Figure 3:
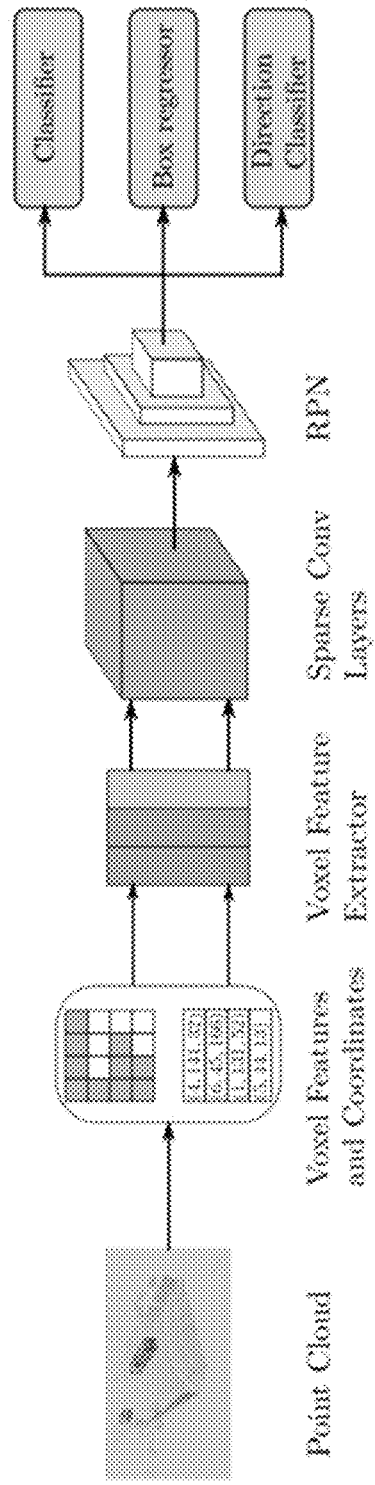
FIG. 3 is a schematic diagram showing the architecture of the SECOND object detection network.
Figure 4:
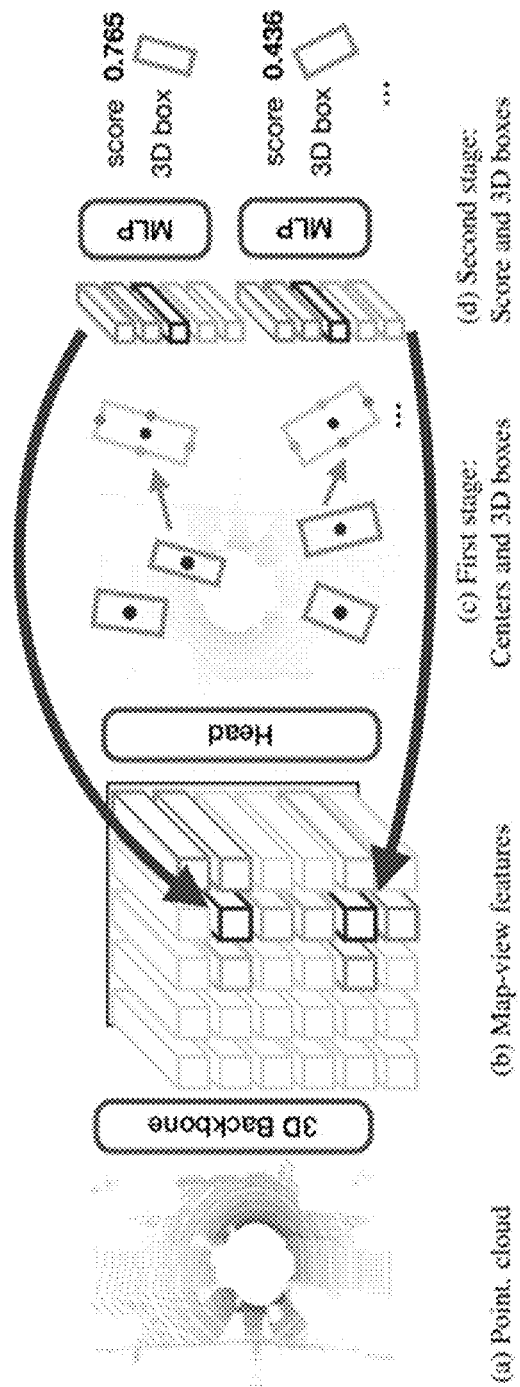
FIG. 4 is a schematic diagram showing the architecture of the CenterPoint object detection network.
Figure 5:
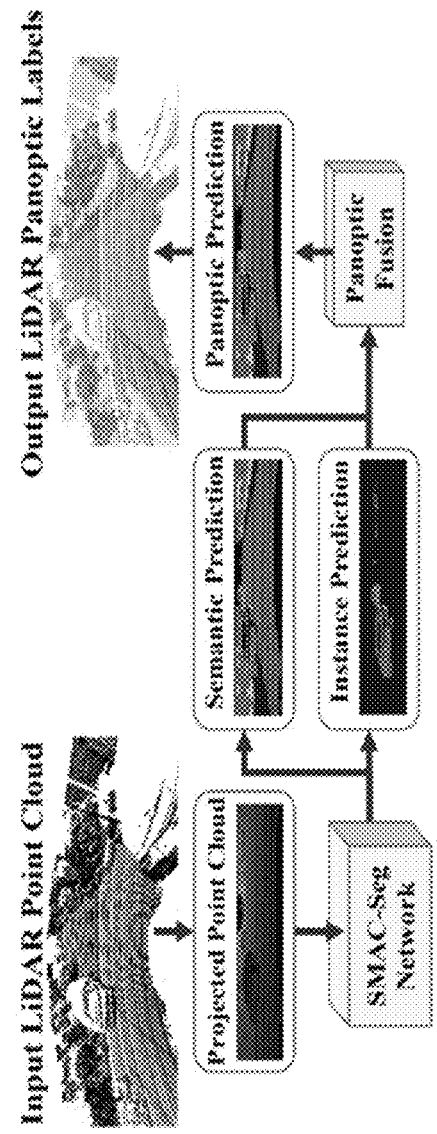
FIG. 5 is a schematic diagram of a 3D panoptic segmentation network (SMAC-Seg).

The system and method of the present disclosure leverages LiDAR-based 3D panoptic segmentation (later referred to as 3D panoptic segmentation) in the perception system for autonomous driving to improve 3D object detection. As shown in FIG. 5, 3D panoptic segmentation unifies two important tasks in perception, semantic segmentation and instance segmentation. Semantic segmentation of LiDAR point clouds is an attempt to identify the category or class label for each 3D point. In contrast, instance segmentation focuses on detecting and segmenting each object instance (also referred to as instance). Some recent methods such as SMAC-Seg (as described by Enxu Li, Ryan Razani, Yixuan Xu, Liu Bingbing in "*SMAC-Seg: LiDAR Panoptic Segmentation via Sparse Multi-directional Attention Clustering*", ICRA 2022, arXiv: 2108.13588, Aug. 31, 2021) and CPSeg (as described by Enxu Li, Ryan Razani, Yixuan Xu, Bingbing Liu in "CPSeg: Cluster-free Panoptic Segmentation of 3D LiDAR Point Clouds", arXiv: 2111.01723, Nov. 2, 2021) achieve instance segmentation by estimating the offset between each LiDAR point and its respective instance center (either mass center or bounding box center), shifting each LiDAR point towards its respective instance center given the offset, and then assigning an instance ID to each group of nearby shifted points. Within the present disclosure, the term "instance" is used to describe an object that is detected by a 3D panoptic segmentation network and the term "object" to describe an object that is detected by a 3D object detection network.

In view of the above, the 3D panoptic segmentation task concerns in the semantic segmentation of stuff and thing classes and instance segmentation of thing classes. Specifically, the term "stuff" refers to classes that are either uncountable or are not critical to distinguish individually for a specific task. In the case of autonomous driving, stuff classes may include vegetation, road, buildings, etc. Opposite to this, the term "things" represent countable classes that are critical for a specific task. In autonomous driving, "things" may refer to cars, pedestrians, traffic cones, etc. For each LiDAR point, a 3D panoptic segmentation network provides the semantic category that the LiDAR point belongs to and the instance ID that the LiDAR point belongs to. For some 3D panoptic segmentation networks, such as SMAC-Seg and CPSeg, the predicted center offset for each LiDAR point is also provided as an additional output.

The system, method and perception module of the present disclosure leverages the output of any 3D panoptic segmentation network to guide any grid-based 3D object detection network and recover features that are relevant to the objects being detected. Feature vector retrieval offers different strategies to retrieve discarded feature vectors and sample the retrieved feature vectors. Feature vector construction may optionally be used to leverage 3D panoptic segmentation output to provide useful additional features for the discarded feature vectors. Feature vector abstraction may optionally further process the feature vectors to be useful for the 3D object detection task. Network augmentation constructs a new set of feature maps using the feature vectors and their associated coordinates and inserts the new set of feature maps into the rest of the 3D object detection network.

Technical Problem Addressed by the Present Disclosure

As described above, for computational efficiency conventional 3D object detection methods are typically grid-based methods that use a "voxelization module" to partition the LiDAR point cloud data into volumetric grids, generate feature maps based on sampled points in each grid, and subsequently use a series of convolution operations to extract useful feature maps. In earlier convolution layers of a neural network for 3D object detection, feature maps possess higher resolutions and encode features at a smaller scale. To obtain a higher receptive field and to reduce complexity, a series of steps are applied throughout the neural network to reduce the resolution of the feature maps (also referred to as down-sampling) via convolutions or pooling operations. For example, in each stage of the 3D CNN inside SECOND, sparse 3D convolution layers encode features from the previous layer into features that have a reduced resolution. In other words, a voxel of the feature maps in a later stage of the 3D CNN represents a larger coverage or volume in the 3D space compared to a voxel in the feature maps in an earlier stage of the 3D CNN. During this process, the convolution layers attempt to summarize the 3D scene into coarser-scale feature maps, but some useful features recognized in the earlier layers are lost.

In another example, for models that possess only the 2D CNN such as PointPillars, a similar problem exists. After converting the point cloud into high-resolution 2D feature maps, to reduce the computation and increase the receptive field, these feature maps are down-sampled in the 2D CNN. As a result, a set of useful features is lost. Because grid-based 3D object detection methods rely on down-sample operations in the CNN, the problem of information loss is common.

Technical Solution of the Present Disclosure

From the above examples of conventional of 3D object detection methods, it is apparent that although the feature extraction process benefits from the faster computation and larger receptive field, some information that can be useful is discarded as a result of down-sampling. The present disclosure provides a solution to this problem by incorporating discarded features from feature maps at multiple resolutions (later referred to as multi-resolution feature maps) generated by an earlier stage of the 3D object detection network (such as a CNN) into a later stage of the 3D object detection network (such as an object detection head) so the discarded but potentially useful features learned in previous stages of the 3D object detection network can be leveraged.

Although certainly helpful, an attempt to incorporate all features from multi-resolution feature maps from an earlier stage of the network into a later stage of the network is unfeasible and impractical, as the recovered features will increase the memory consumption and computation significantly. Instead, the present disclosure provides an effective strategy to select important and relevant locations on the feature maps, recover feature at those locations, and incorporate the recovered features into the later stage of the 3D object detection network.

The present disclosure provides a perception module that can be used in any grid-based 3D object detection network to improve prediction accuracy. The perception module leverages the prediction results from any 3D panoptic segmentation network and retrieves relevant locations and information on the LiDAR point cloud based on one or a combination of instance masks (a map of locations of each instance), a center density map (a map that encodes probabilities of that a bounding box center is at a location for each location associated with an instance), or semantic probability map (a map that encodes probabilities of semantic classes for each location associated with an instance). These locations and information are used in the perception module to recover and process relevant features in multi-resolution feature maps from the early stage of the 3D object detection network. The extracted features obtained by the perception module can be used to augment the later stage of the 3D object detection network and improve the robustness and accuracy of the overall 3D object detection network.

In CenterPoint described above, initial detection predictions are already generated in the object detection head prior to a second stage refinement network. The network locates four sides of each predicted bounding box, and then select features for those locations from the output of 3D CNN. The selected features, which were previous used as part of the input to generate the initial detection predictions, are processed again. The processed features are used to refine the predicted parameter regarding the specific predicted bounding box.

The advantage of the approach of CenterPoint is that it places emphasis on features from certain locations. The object detection head utilizes a single-resolution (coarsest resolution) 2D feature maps to generate a center heat map and the estimated box parameters at each location on the feature maps. To generate the initial detection predictions, the object detection head then takes the estimated box parameters at the local-maxima of center heat map. The accuracy of these initial detection predictions is limited, as the features and estimated box parameters in other locations that are mistakenly not identified as local-maxima are not considered. Using the second stage refinement network, additional features at locations thought to be the boundaries of the object are used to make small adjustments to the estimated box parameters, potentially improving the confidence score and other estimated box parameters in some predictions. It may also lower the confidence score of some predictions to reject them from the final detection predictions, reducing the false positives in the final detection predictions.

However, the approach of CenterPoint has disadvantages. First, the refinement network only considers the lowest-resolution 2D feature maps that are the output of 3D CNN but significant loss of information occurs during the down-sampling process within the 3D CNN. The refinement stage only pays more attention to the features that have already been used to generate the initial detection predictions, instead of recovering the lost features due to down-sampling. Another important aspect is that the detection of objects, represented by the local-maxima of center heat map, occurs before the refinement stage. As a result, the refinement network does not allow the 3D object detection network to pick up more objects that it would otherwise miss but only refine the detections that are already made by the 3D object detection network. In contrast, a better strategy is provided by the present disclosure which augments the 3D object detection network and provides guidance to enable the object 3D detection network to both recall more objects and improve the quality of the predictions made. In addition, the effectiveness of selecting the locations to extract features from in Centrepoint largely depends on the accuracy of the 3D object detection network itself. The refinement network only considers five locations (center and the four sides) based on the local-maxima of the center heat map and the associated estimated box parameters at the local-maxima. If the estimated box parameters (such as length, width, and yaw angle) from the object detection head is inaccurate, the features at locations considered by the refinement network will not be meaningful and may even confuse and harm the detection predictions. The approach of the present disclosure overcomes at least some of the disadvantages of the approach of CenterPoint.

Instead of focusing on feature maps immediately after the CNN, solution of the present disclosure recovers the lost features from multi-resolution feature maps generated in various stages of a 2D or 3D CNN prior to the object detection head, which effectively minimizes the information loss during the down-sampling process. In addition, when selecting the locations of feature maps to retrieve information from, a multi-task strategy is used to leverage the final output of a robust 3D panoptic segmentation network instead of relying on the intermediate predictions from the object detection head. The final prediction results of the 3D panoptic segmentation network have richer information and provide more accurate locations to recover information from compared to the initial detection predictions from the object detection head. Extending from this multi-task strategy, the retrieved features with other useful handcrafted features and/or predicted results from the 3D panoptic segmentation network may be injected, providing helpful information regarding the properties (such as geometry, class, and size) of each instance. Moreover, instead of using features at certain locations to refine the prediction results already made by the object detection head, the recovered features are used to augment the 3D object detection network and influence the object detection head itself to make better predictions, improving not only the precision (quality of detection predictions) but also recall (quantity of correct detections made) of the detection predictions.

In accordance with a first aspect of the present disclosure, there is provided a computer-implemented method of three-dimensional (3D) object detection, the method comprising: receiving, from a panoptic segmentation network, panoptic segmentation predictions, the panoptic segmentation network receiving a 3D point cloud as input and outputting the panoptic segmentation predictions, wherein the panoptic segmentation predictions including one or a combination of an instance mask providing locations of each instance, a center density map, instance center offset or a sematic probability map that encodes probabilities of semantic classes for each location; receiving, from an object detection network having a plurality of layers, intermediate feature maps from one or more early layers of the object detection network, the object detection network receiving the 3D point cloud as input and outputting feature maps at each layer; retrieving feature vectors from the intermediate feature maps using the panoptic segmentation predictions; and combining the retrieved feature vectors with feature maps from one or more late layers of the object detection network for generating object detection predictions.

In some or all examples of the first aspect, the panoptic segmentation predictions including a combination of an instance mask providing locations of each instance, a center density map and a sematic probability map.

In some or all examples of the first aspect, the panoptic segmentation network is a 3D panoptic segmentation network.

In some or all examples of the first aspect, the object detection network is a 3D object detection network.

In some or all examples of the first aspect, the panoptic segmentation predictions including a combination of an instance mask providing locations of each instance, a center density map, instance center offset and a sematic probability map In some or all examples of the first aspect, the retrieving feature vectors from the plurality of feature intermediate maps using the panoptic segmentation predictions comprises: selecting one or more locations in the intermediate feature maps for feature vector retrieval based on the instance mask or the center density map; and extracting feature vectors from the intermediate feature maps at the selected locations.

In some or all examples of the first aspect, all locations indicated by the instance mask or center density map are selected.

In some or all examples of the first aspect, a subset of all locations indicated by the instance masks or center density map are selected for by random sampling.

In some or all examples of the first aspect, a subset of all locations indicated by the instance masks are selected, wherein the subset is a predetermined of locations closest to a mass center for each instance in the instance mask.

In some or all examples of the first aspect, all locations that have a non-zero center density value indicated by the center density map are selected, all locations that have a center density value above a predetermined threshold are selected, or locations having a local-maxima are selected.

In some or all examples of the first aspect, neighboring locations associated with each instance of the instance masks or each predicted center on the center density maps are selected.

In some or all examples of the first aspect, each layer of the object detection network generates feature maps at a specific resolution, wherein the intermediate feature maps comprise multi-resolution feature maps, wherein retrieving feature vectors is performed for each of the intermediate multi-resolution feature maps.

In some or all examples of the first aspect, the method further comprises: processing a retrieved feature vector to generate a processed feature vector having additional information; and combining the processed feature vector for an intermediate feature map at a first resolution with an unprocessed feature vector for an intermediate feature map at a second resolution different from the first resolution.

In some or all examples of the first aspect, the first resolution is higher than the second resolution.

In some or all examples of the first aspect, the processing is performed by a neural network comprising a Voxel Feature Encoder (VFE) and Multi-Layer Perceptron (MLP).

In some or all examples of the first aspect, the processed feature vector is combined with the unprocessed feature vector using a cascade connection.

In some or all examples of the first aspect, the method further comprises: grouping retrieved feature vectors representing a single instance into a single feature vector.

In some or all examples of the first aspect, the method further comprises: grouping retrieved feature vectors of each predicted center and its associated neighboring locations into a single feature vector.

In some or all examples of the first aspect, the grouping comprises: processing the retrieved feature vectors from a predicted center location and its neighboring locations to generate processed feature vectors; and performing max-pooling and average-pooling on the processed feature vectors to generate a single feature vector representing the predicted center location.

In some or all examples of the first aspect, the method further comprises: generating new feature vectors based one or a combination of a relative position vector indicating a relative location of each location of the retrieved feature vectors, a semantic vector indicating a semantic probability at each location of retrieved feature vectors, or a center density vector indicating a center density at each location of the retrieved feature vectors; and combining the retrieved feature vectors with the new feature vectors.

In some or all examples of the first aspect, combining the retrieved feature vectors with feature maps from one or more late layers of the object detection network comprises: generating new feature maps based on the retrieved feature vectors; combining the new feature maps with the feature maps from the one or more late layers of the object detection network to generate combined feature maps.

In some or all examples of the first aspect, the method further comprises: causing object detection predictions to be generated from the combined feature maps using the object detection network.

In accordance with another aspect of the present disclosure, there is provided a computer-implemented method of three-dimensional (3D) object detection, the method comprising: receiving, from a panoptic segmentation network, panoptic segmentation predictions, the panoptic segmentation predictions including one or a combination of an instance mask, a center density map (and/or instance center offset), and a sematic probability map, the panoptic segmentation network inputs 3D point cloud information and outputs the panoptic segmentation predictions; receiving, from an object detection network, feature maps from an early layer (or stage) of the object detection network, the object detection network inputs the 3D point cloud information and outputs the feature maps; combining the panoptic segmentation predictions with the feature maps to generate recovered feature information; and combining the recovered feature information with feature maps from a last layer (or stage) of the object detection network to generate object detection predictions.

In accordance with a further aspect of the present disclosure, there is provided a computing device comprising one or more processors and a memory. The memory having tangibly stored thereon executable instructions for execution by the one or more processors. The executable instructions, in response to execution by the one or more processors, cause the computing device to perform the methods described above and herein.

In accordance with a further aspect of the present disclosure, there is provided a non-transitory machine-readable medium having tangibly stored thereon executable instructions for execution by one or more processors. The executable instructions, in response to execution by the one or more processors, cause the one or more processors to perform the methods described above and herein.

Other aspects and features of the present disclosure will become apparent to those of ordinary skill in the art upon review of the following description of specific embodiments of the application in conjunction with the accompanying figures.

DETAILED DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although such functions are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

The following acronyms and Abbreviations are used in the present disclosure:

| | Acronym/Abbreviation/Initialism |
|---|---|
| BEV | Bird's Eye View |
| LiDAR | Light Detection and Ranging |
| CNN | Convolutional Neural Network |
| MLP | Multi-Layer Perceptron |
| VFE | Voxel Feature Encoder |

Within the present disclosure, the following are used interchangeably terms "recover" and "retrieve", and "construct" and "generate".

For the purpose of the present disclosure, the term "real-time" means that a computing operation or process is completed within a relatively short maximum duration, typically milliseconds or microseconds, fast enough to affect the environment in which the computing operation or process occurs, such as the inputs to a computing system.

Perception Module and Network Incorporating the Same

Figure 6:
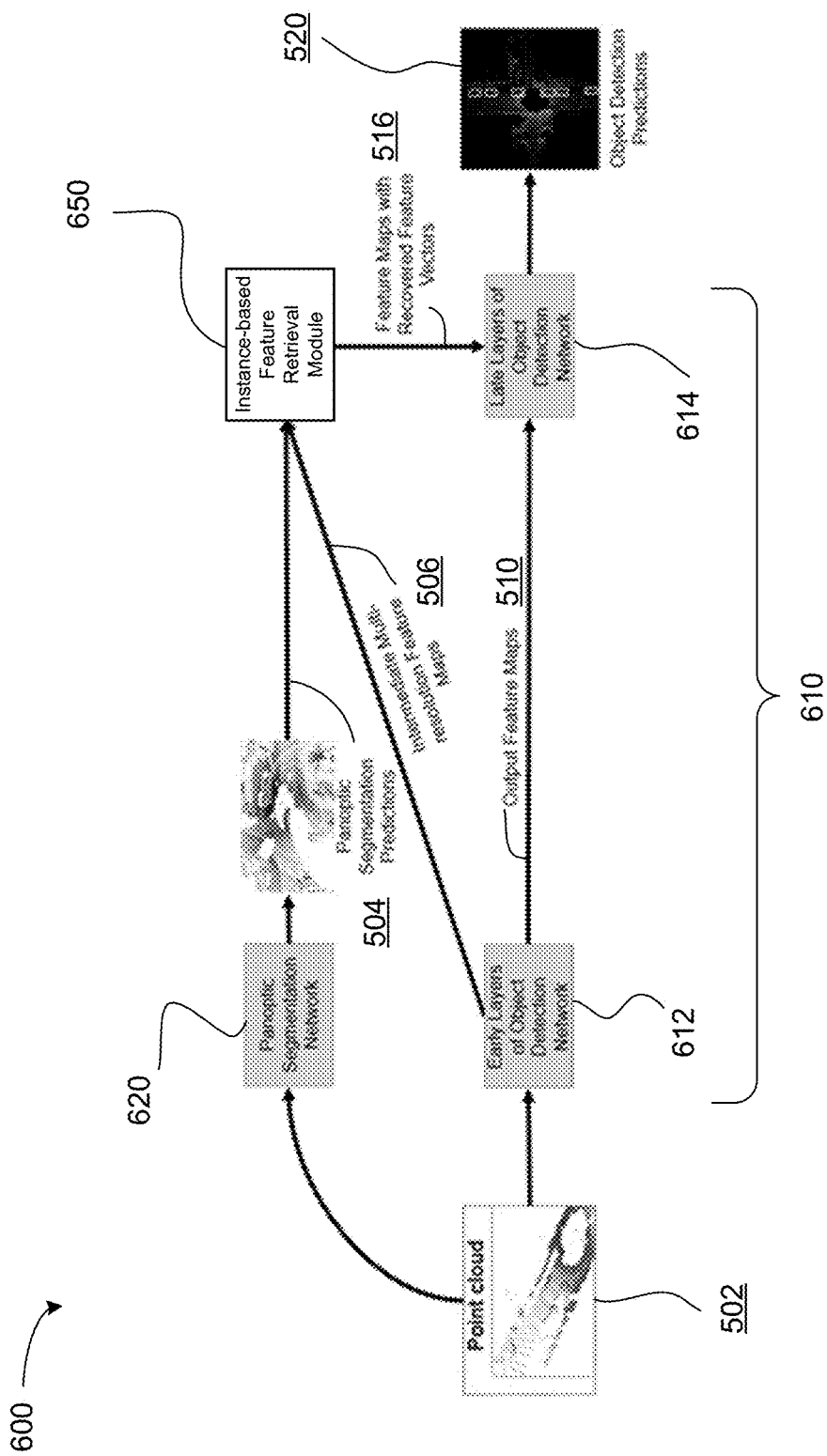
FIG. 6 is a schematic diagram of a shared 3D object detection network and 3D panoptic segmentation network having an instance-based feature retrieval (IFR) module in accordance with embodiments of the present disclosure.

FIG. 6 is a schematic diagram of a shared 3D object detection network and 3D panoptic segmentation network 600 in accordance with embodiments of the present disclosure. The network 600 is a neural network which comprises a 3D object detection network 610, a 3D panoptic segmentation network 620, and a perception module (later referred to as an instance-based feature retrieval (IFR) module 650) in accordance with embodiments of the present disclosure. Each of the 3D object detection network 610, 3D panoptic segmentation network 620, and IFR module 650 comprises one or more neural networks.

The network 600 receives 3D point cloud data 502 defining one or more 3D point clouds. The 3D point cloud data 502 may be generated from a sensor such as a LiDAR sensor (or unit) of an autonomous driving vehicle. In some examples, the 3D point cloud data 502 is from a LiDAR dataset. The 3D point cloud data 502 is received by both the 3D object detection network 610 and 3D panoptic segmentation network 620. The 3D object detection network 610 may be any grid-based 3D object detection network and the 3D panoptic segmentation network 620 may be any 3D panoptic segmentation network.

The network 600 may be part of an onboard computer vision or perception system carried by, or embedded in, a computing system in autonomous driving vehicle. The onboard computer vision or perception system may be part of, or connected to, t vehicle control system. The vehicle control system may be coupled to a drive control system and a mechanical system of an autonomous driving vehicle. The vehicle control system can in various embodiments allow the autonomous driving vehicle to be operable in one or more of a fully-autonomous, semi-autonomous or fully user-controlled mode. Alternatively, the network 600, or any one or more of the 3D object detection network 610, 3D panoptic segmentation network 620 or IFR module 650 may be located remotely from the autonomous driving vehicle and may exchange data with the vehicle using an onboard communication system of the autonomous driving vehicle (e.g., network interface 110 of the computing system 100). In such alternative embodiments, 3D point cloud data 502 from the LiDAR sensor of the autonomous driving vehicle is sent to the remotely located components for computation and computed information such as object detection predictions and optional feature maps are sent to the autonomous driving vehicle.

The 3D panoptic segmentation network 620 receives the 3D point cloud data 502, generates and outputs panoptic segmentation predictions 504. Each panoptic segmentation prediction 504 may include one or a combination of instance masks, a center density map, instance center offset, or a semantic probability map. An instance masks is a map of locations of each instance. A center density map is a map that encodes probabilities of that a bounding box center is at a location for each location associated with an instance. The semantic probability map is a map that encodes probabilities of semantic classes for each location associated with an instance. The semantic probability map comprises a semantic probability vector for each location associated with an instance. The semantic probability vector is a vector of size G that predicts the likelihood that the 3D point cloud 502 in a specific location belongs to each of G classes.

The 3D object detection network 610 comprises a voxelization module (such as a VFE) followed by a CNN (which can be 3D CNN, 2D CNN, or a combination of both) which receive the 3D point cloud data 502 and encode them into feature maps. The CNN of the 3D object detection network 610 comprises early layers (or stages) 612 and late layers 614. The number of layers in the CNN, the number of early layers 612 and the number of late layers 614 may vary. Each layer of the CNN generates feature maps at a specific resolution or dimension. The number and resolution of feature maps generated by the CNN depends on the number and configuration of the layers of the CNN, which may vary. Intermediate multi-resolution feature maps 506 are output from the early layers 612 of the CNN and sent to the IFR module 650. The number and resolution of the intermediate multi-resolution feature maps 506 may vary. Feature maps 510 from the early layers 612 of the CNN are also output and sent to the later layers 614 of the CNN. The number and resolution of the feature maps output from the early layers 612 of the CNN and input into the later layers 614 of the CNN may vary.

The IFR module 650 receives the panoptic segmentation prediction generated by the 3D panoptic segmentation network 620 and the intermediate multi-resolution feature maps 506 generated by some or all of the early layers 612 of the CNN within the 3D object detection network 610 as input and outputs a set of feature maps with retrieved feature vectors 516. The set of feature maps with retrieved feature vectors 516 are combined with the feature maps 510 output from the later layers 614 of the CNN of the 3D object detection network, and object detection predictions 520 are generated and output based on the combined feature maps.

The IFR module 650 comprises several components (or sub-modules). The first component is a feature vector retrieval component which recovers features from the intermediate multi-resolution feature maps 506 at a plurality of relevant locations, producing a feature vector for each location. The second component is a feature vector construction component in which handcrafted or encoded features are added to the retrieved feature vectors. The second component is optional. The third component is a feature vector abstraction component in which the feature vectors are further processed to extract meaningful information. The third component is optional. The final component is a network augmentation component in which the feature vectors are used to construct a set of feature maps which are passed to the rest of the 3D object detection network to guide the object detection predictions.

Figure 22:
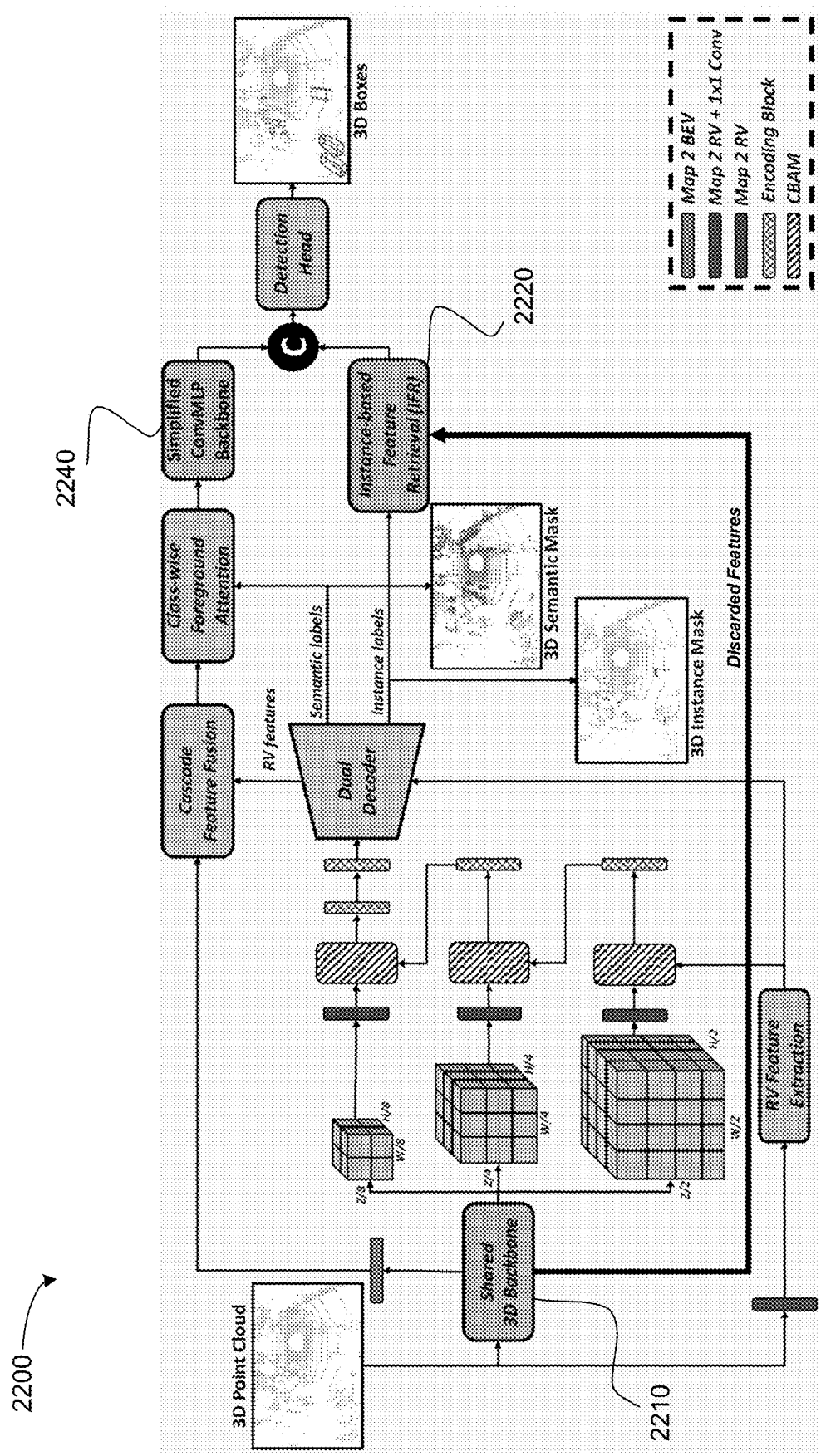
FIG. 22 is a schematic diagram of a shared 3D object detection network and 3D panoptic segmentation network having a IFR module in accordance with an example embodiment of the present disclosure.

FIG. 22 is a schematic diagram of a shared 3D object detection network and 3D panoptic segmentation network 2200 having a IFR module 2220 in accordance with an example embodiment of the present disclosure. The network 2200 integrates a BEV-based 3D object detection network and a Range View (RV)-based 3D panoptic segmentation network to improve the performance of both 3D object detection and based 3D panoptic segmentation. The 3D panoptic segmentation network is based on the CPSeg 3D panoptic segmentation network noted above due to its real-time performance and high accuracy. CPSeg uses a U-Net architecture with two task-specific decoders. In addition, its RV feature extraction module recovers features based on 3D coordinates and predicted surface normal of the projected points, respectively. The 3D object detection network is based on the object detection head from the CenterPoint 3D object detection network noted above due to its superior performance in 3D object detection.

For RV-based panoptic-level features to object detection, cascade feature fusion and class-wise foreground attention modules are used as described in H. Fazlali, Yixuan Xu, Y. Ren, Bingbing Liu, *A versatile multi-view framework for lidar-based 3d object detection with guidance from panoptic segmentation*, arXiv: 2203.02133v1, Mar. 7, 2022, 12 pages. The cascade feature fusion module fuses the BEV and RV features from a shared 3D backbone 2210 and a panoptic segmentation model, respectively, allowing the detection model to benefit from both BEV and RV projection methods. The RV projection is helpful for detecting small and nearby objects while BEV is more robust in detecting objects that are occluded or distant due to its scale-invariant property. The class-wise foreground attention module augments the fused BEV-RV features with the semantic estimations of the panoptic segmentation model.

To integrate the two methods into a unified framework, a shared 3D backbone 2210 that extracts multi-scale 3D features from voxelized point cloud is used. The 3D backbone 2210 may be used to develop features for both the detection and panoptic segmentation tasks that are beneficial and can boost the performance of both tasks. These multi-scale features are compressed and projected to the RV plane, fused with the set of features extracted directly from the RV-projected point cloud via three Convolutional Bottleneck Attention Modules (CRAM) as described in Woo, S., Park, J., Lee, J. Y., Kweon, I. S., *Cbam: Convolutional block attention module*, Proceedings of the European conference on computer vision (ECCV), pp. 3-19 (2018), and fed to individual encoding blocks of the panoptic segmentation model. This lightweight operation effectively augments the panoptic segmentation model with detection-level features. The network 2200 follows other detection methods that use 3D backbones and projects the lowest resolution voxel features from 3D backbone to BEV for the object detection task. However, the features of the shared 3D backbone 2210 also encode instance-level and semantic-level information which have shown to be useful for the 3D object detection. A new and more effective 2D backbone 2240 is also provided based on a simplified version of the ConvMLP blocks to process features for the object detection head. The IFR module 2220 augments the object detection head by leveraging the instance IDs to recover relevant object features that are otherwise lost during down-sampling operations in the 3D backbone 2210.

Figure 23:
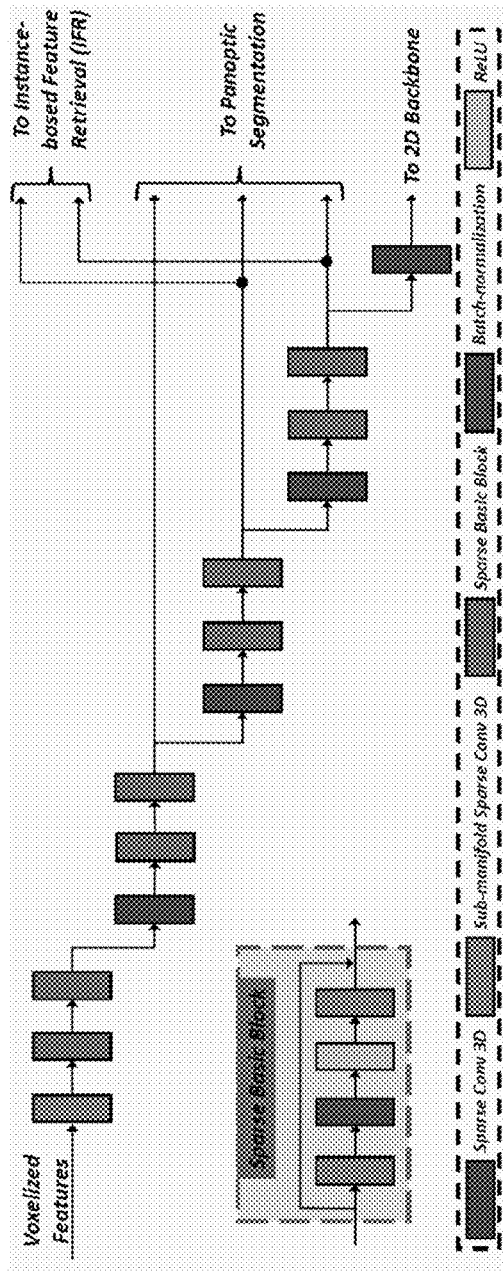
FIG. 23 is a schematic diagram of a shared 3D backbone of the network of FIG. 22.

FIG. 23 is a schematic diagram of the shared 3D backbone 2210 of the network 2200 of FIG. 22. The 3D backbone 2210 is similar to those used in other 3D detection methods and is responsible for the extraction of features from 3D voxels. As shown in FIG. 23, the backbone is composed of 3D sparse sub-manifold convolution and 3D sparse convolution layers. The former only operates on non-empty voxels and down-samples the features to reduce computational complexity and increase the effective receptive fields. The later works in any non-empty neighborhood. In the 3D object detection methods that rely on this type of 3D backbones, only voxel features in the coarsest resolution $$\left(\frac{Z}{8} \times \frac{H}{8} \times \frac{W}{8}\right)$$

are mapped to the BEV plane and used as input to the 2D backbone.

The 3D backbone 2210 of the network 2200 adopts the same strategy as it is more efficient to work on the coarsest feature resolution. However, in contrast to the former 3D object detection methods, important and detailed object information embedded in two sets of higher resolution voxel features will be recovered later in the IFR module 2220. Moreover, three sets of higher resolution voxel features are projected to RV and shared with the panoptic segmentation module. These multi-scale voxel-based features augment the panoptic segmentation module that segments based on a single resolution RV plane. Meanwhile, this augmentation also enforces the 3D backbone to learn the semantic- and instance-level features. These strategies leverage multi-resolution features in the 3D backbone for multiple tasks and projection views not only augment the rest of the framework but also effectively condition the 3D backbone to develop a richer set of features.

Figure 24:
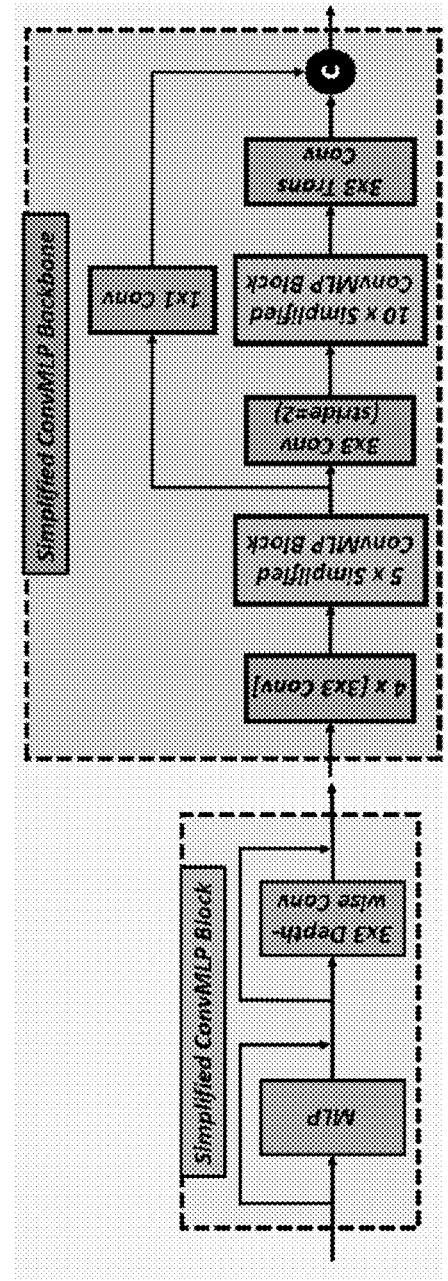
FIG. 24 is a schematic diagram of a simplified ConvMLP backbone of the network of FIG. 22.

FIG. 24 is a schematic diagram of the simplified ConvMLP backbone 2240 of the network 2200 of FIG. 22. Recently, MLP-based vision backbones are becoming more popular and receiving more attention. This is because in contrary to vision transformers, MLP-based vision backbones do not rely on the expensive multi-head attention mechanism. Moreover, in some cases (e.g., ConvMLP) MLP-based vision backbones can compete or even perform better than traditional fully convolution-based backbones in dense prediction vision tasks such as segmentation and detection.

The simplified ConvMLP backbone 2240 of the network 2200 is a simplified version of the ConvMLP used in image-based dense vision tasks to process the BEV-projected features from the shared 3D backbone 2210 before feeding the features to the object detection head. The simplified ConvMLP 2240 and the overall 2D backbone architecture are shown in FIG. 24. Compared to the original ConvMLP block, the last MLP layer is removed and a skip connection over the convolution layer is added to further ease the gradient flow. In this architecture, the MLP block enables the interaction of features in each spatial location, while the subsequent depth-wise convolution enables efficient space-wise interaction. In the backbone architecture shown in FIG. 22, consecutive Cony blocks are first applied to enhance features interactions and connections spatial-wise. Each Cony block comprises a convolution layer followed by a batch-normalization and Rectified Linear Unit (ReLU). The resulting features are then sent through the first set of consecutive simplified ConvMLP blocks, down-sampled, and fed to another set of consecutive simplified ConvMLP blocks. The outputs of these two sets of simplified ConvMLP blocks are then matched and concatenated as the final set of the 2D features, which is sent to the object detection head.

Compared to the regular 2D backbone, the simplified ConvMLP backbone 2240 boosts the detection performance without a steep increase in the model complexity. More specifically, compared to a regular 3×3 convolution layer, the simplified ConvMLP backbone 2240 uses 54.6% less memory and 54.8% fewer floating point operations per second (FLOPs). Thus, by replacing regular convolutions with the lighter simplified ConvMLP blocks, more consecutive convolutions in a single resolution can be built, achieving a larger receptive field without the need for further down-sampling. In addition, unlike other CNNs that commonly employ a single 1×1 convolution layer for channel depth adjustment, this architecture employs MLP blocks extensively to place more emphasis on feature extraction within each BEV plane location.

Figure 25:
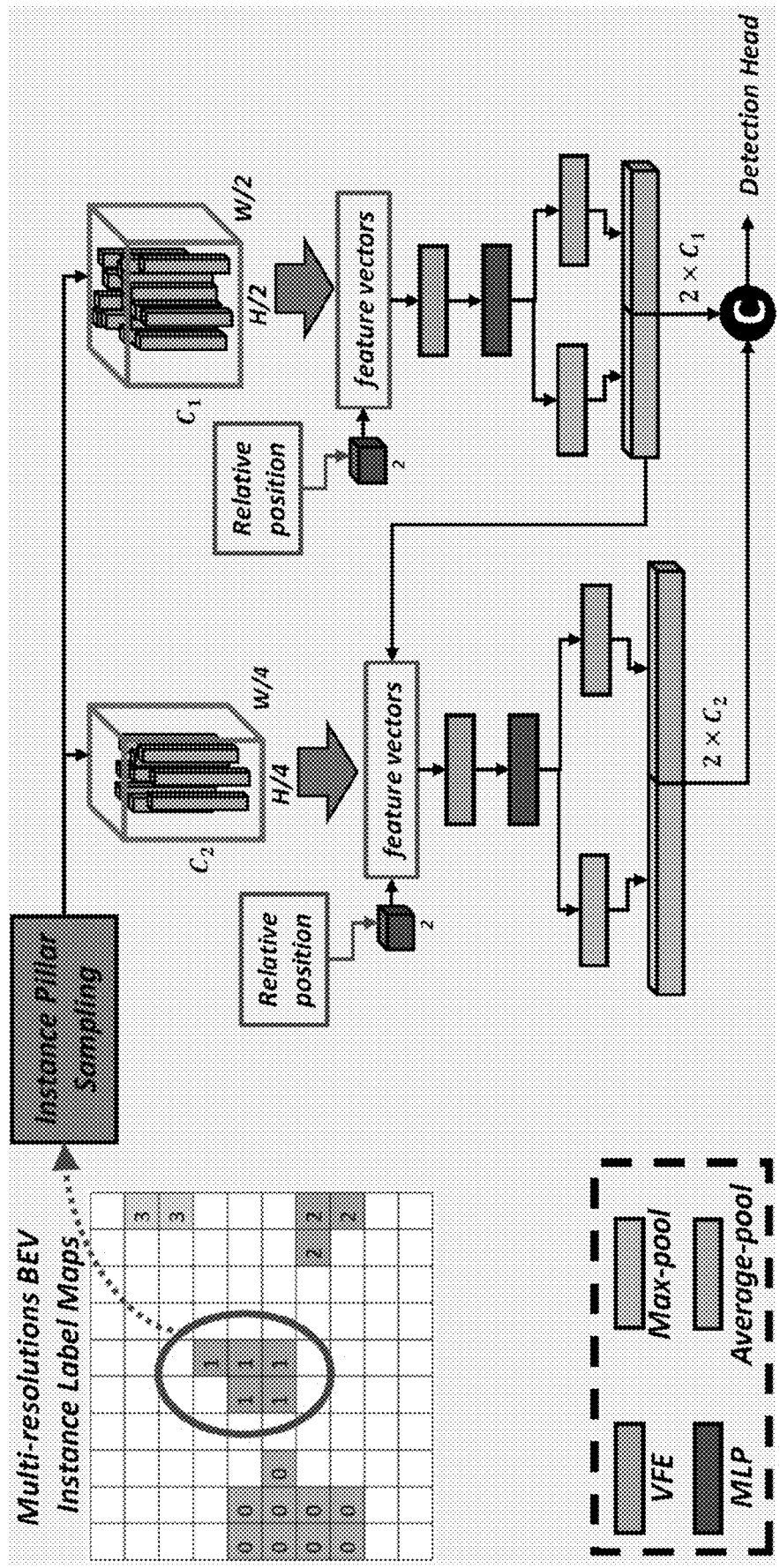
FIG. 25 is a schematic diagram of an IFR module of the network of FIG. 22.

FIG. 25 is a schematic diagram of an IFR module of the network 2200 of FIG. 22. To augment the coarse-scale features extracted by the Simplified ConvMLP backbone 2220, discarded features during down-sampling operations in the shared 3D backbone 2210 are leveraged by the IFR module 2240. The IFR module 2240 recovers multi-scale detailed features for each candidate object from the $$\left(\frac{Z}{2} \times \frac{H}{2} \times \frac{W}{2}\right) \text{ and } \left(\frac{Z}{4} \times \frac{H}{4} \times \frac{W}{4}\right)$$

resolutions feature maps in the shared 3D backbone 2210. The IFR module 2240 then constructs a new set of features to augment the object detection head.

To reduce the computational complexity, on all the BEV plane locations, voxel features along the height dimension are averaged. The resulting features are referred to as averaged-voxels features. A selection strategy is then used to select average-voxels based on instance masks estimated by the panoptic segmentation. Specifically, given the lth scale $s_l$ averaged-voxels features and instance masks of the same scale on the BEV plane, the mean X and Y coordinates of each instance are calculated. This gives the mass center location for each instance on the BEV plane. From all the BEV locations that represents each instance, the $K_{s_l}$ nearest averaged-voxels to each instance mass center are then selected.

After sampling $K_{s_l}$ averaged-voxels for each instance, the relative coordinates of each sampled averaged-voxel to its instance mass center on both x- and y-axis are computed and concatenated to the corresponding feature vector as relative position embedding. This allows the IFR module to be aware of the geometry of sampled averaged-voxels for each instance. These feature vectors are consecutively processed by a VFE and a MLP layer. The resulting feature vectors for each instance are then pooled using max- and average-pooling layers and concatenated. This is illustrated in the following equations:

$$v_{j,s_l}^i = \text{MLP}(\text{VFE}(\text{Concat}(f_{j,s_l}^i, p_{j,s_l}^i)))$$

$$v_{s_l}^i = \text{Concat}(\text{Avg Pool}(v_{j,s_l}^i), \text{Max Pool}(v_{j,s_l}^i))$$

where and $f_{j,s_l}^i$ and $p_{j,s_l}^i$ denote the feature vector and position embedding vector for the jth averaged-voxel belonging to ith instance in lth scale, respectively.

Each resulting single feature vector $v_{s_l}^i$ encodes and summarizes the sampled averaged-voxels features of the ith instance that it corresponds to. The extracted features of an instance in the higher resolution $s_l$ are concatenated to every sampled averaged-voxel feature vector of that instance in the lower resolution $s_{l+1}$ using a cascade connection prior to feeding to the VFE layer. This enables the lower resolution averaged-voxels of an instance to leverage the encoded features of the same instance in the higher resolution feature maps. Finally, the resulting encoded feature vectors of each instance in different resolutions are concatenated and distributed to all the BEV locations that correspond to the instance according to the coarse-scale instance masks. The new set of feature maps is then concatenated to the output features from the 2D backbone and fed to the object detection head. By doing so, the object detection head is effectively augmented by recovering and processing multi-scale information that is unique for each instance and commonly lost prior to the 2D backbone.

Figure 27:
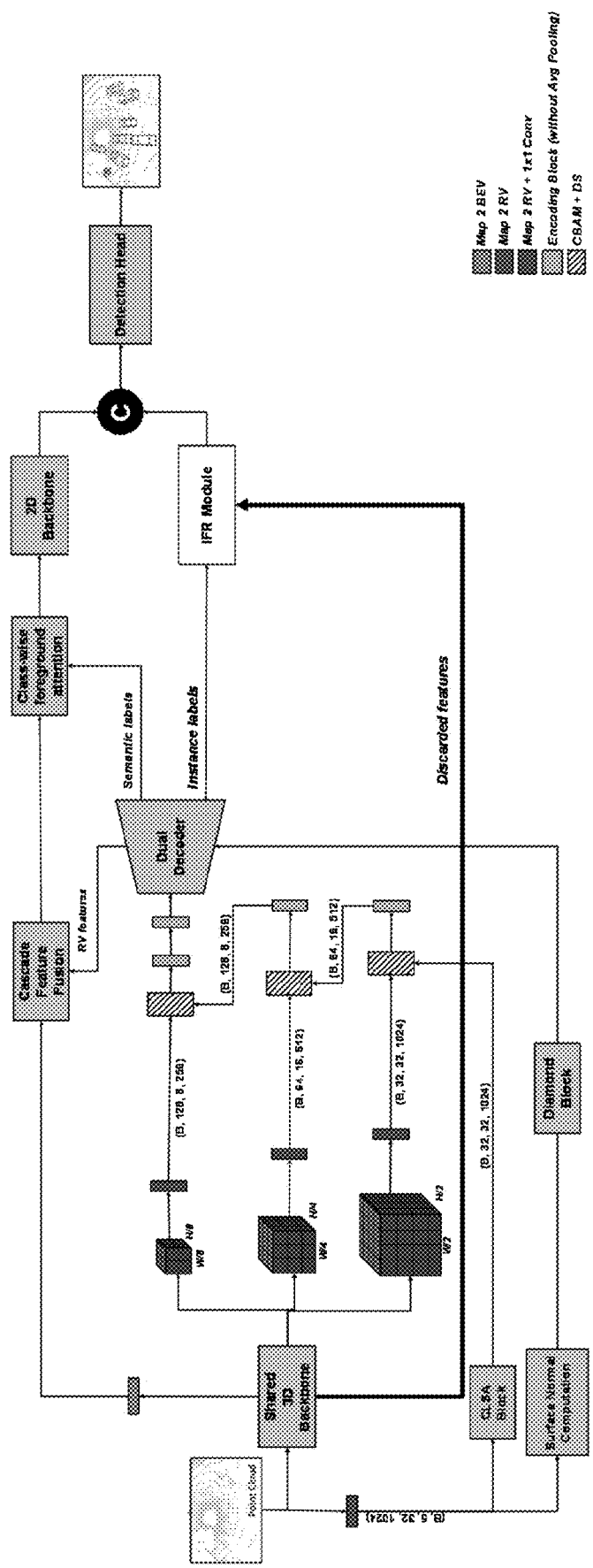
FIG. 27 is a schematic diagram of a shared 3D object detection network and 3D panoptic segmentation network in accordance with another example embodiment of the present disclosure.

FIG. 27 is a schematic diagram of a shared 3D object detection network and 3D panoptic segmentation network in accordance with another example embodiment of the present disclosure. The shared 3D object detection network and 3D panoptic segmentation network of FIG. 27 is similar to the network 2200 of FIG. 22 but includes additional features and some different features.

Figure 28:
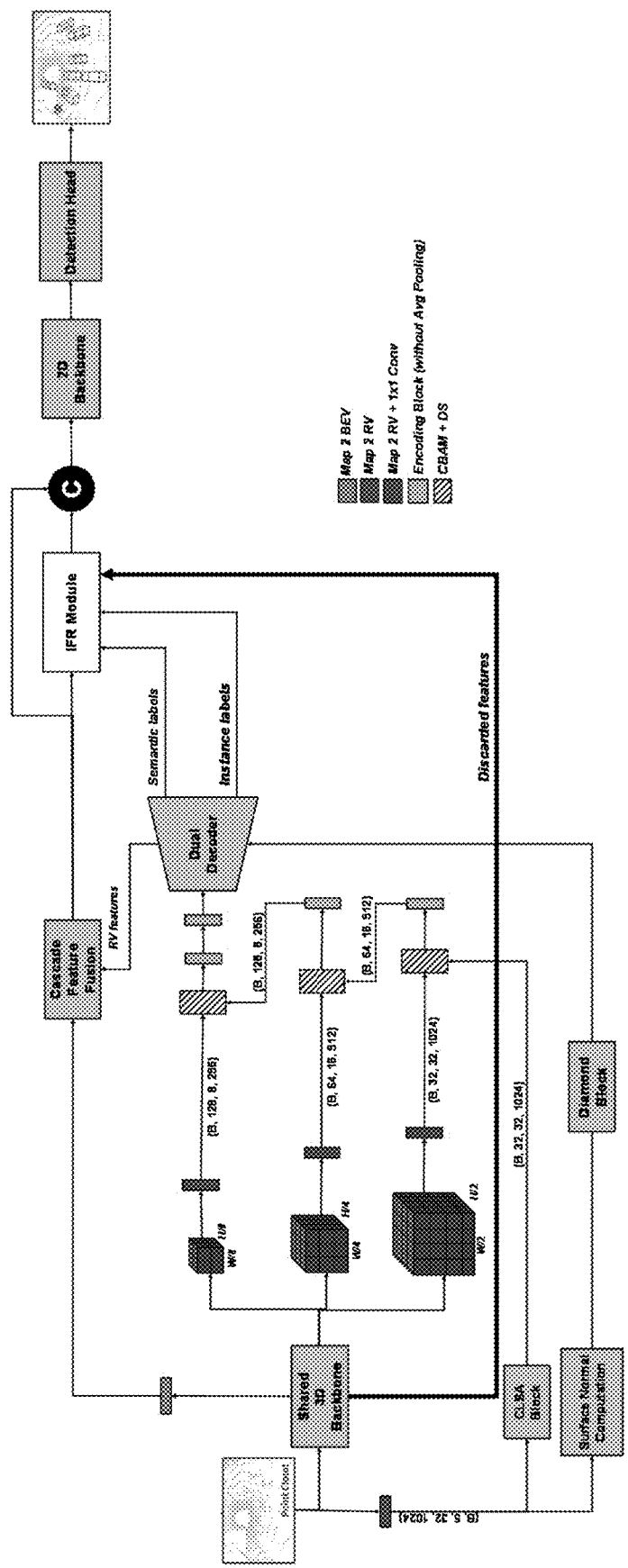
FIG. 28 is a schematic diagram of a shared 3D object detection network and 3D panoptic segmentation network in accordance with a further example embodiment of the present disclosure.

FIG. 28 is a schematic diagram of a shared 3D object detection network and 3D panoptic segmentation network in accordance with a further example embodiment of the present disclosure. The shared 3D object detection network and 3D panoptic segmentation network of FIG. 28 is similar to the network of FIGS. 22 and 27 in instance masks generated by the 3D panoptic segmentation network are used for feature vector retrieval but differs in that the output from the IFR module is combined with the output of a cascade feature fusion module of the 3D object detection network before the 2D backbone and detection head of the 3D object detection network.

Figure 29:
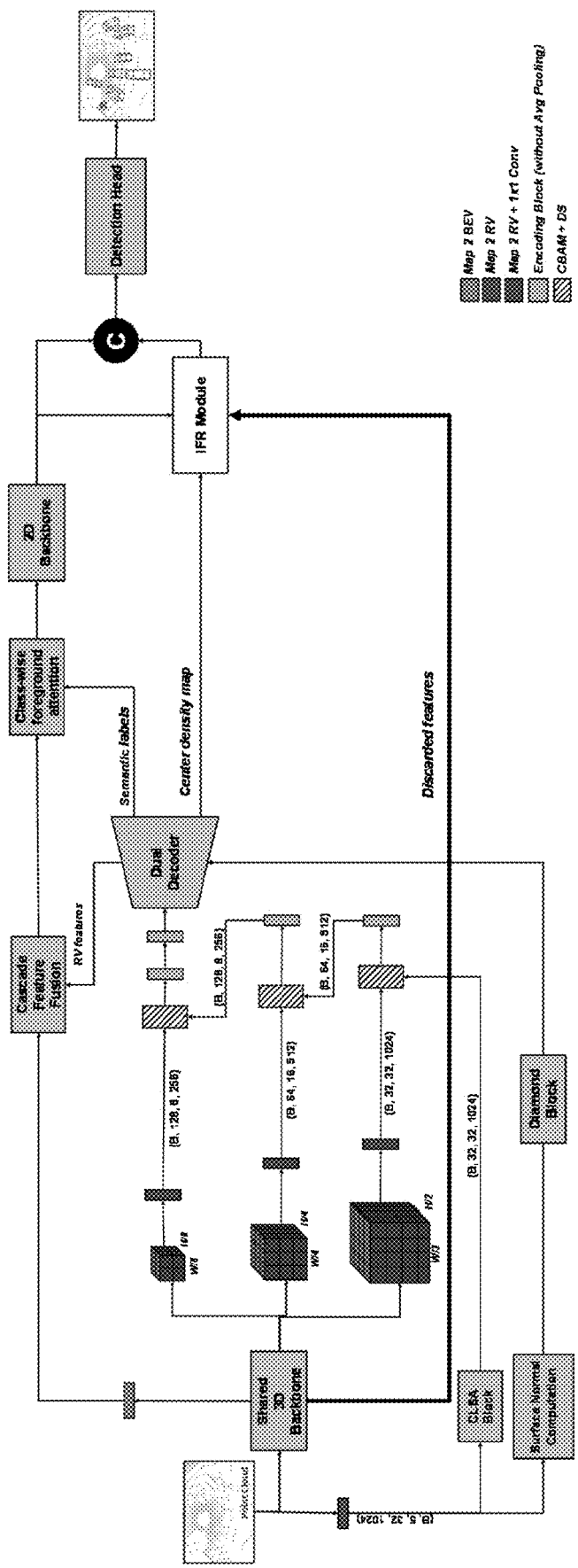
FIG. 29 is a schematic diagram of a shared 3D object detection network and 3D panoptic segmentation network in accordance with yet a further example embodiment of the present disclosure.

FIG. 29 is a schematic diagram of a shared 3D object detection network and 3D panoptic segmentation network in accordance with yet a further example embodiment of the present disclosure. The shared 3D object detection network and 3D panoptic segmentation network of FIG. 29 is similar to the network of FIG. 27 but differs in that center density maps generated by the 3D panoptic segmentation network are used for feature vector retrieval.

Figure 26:
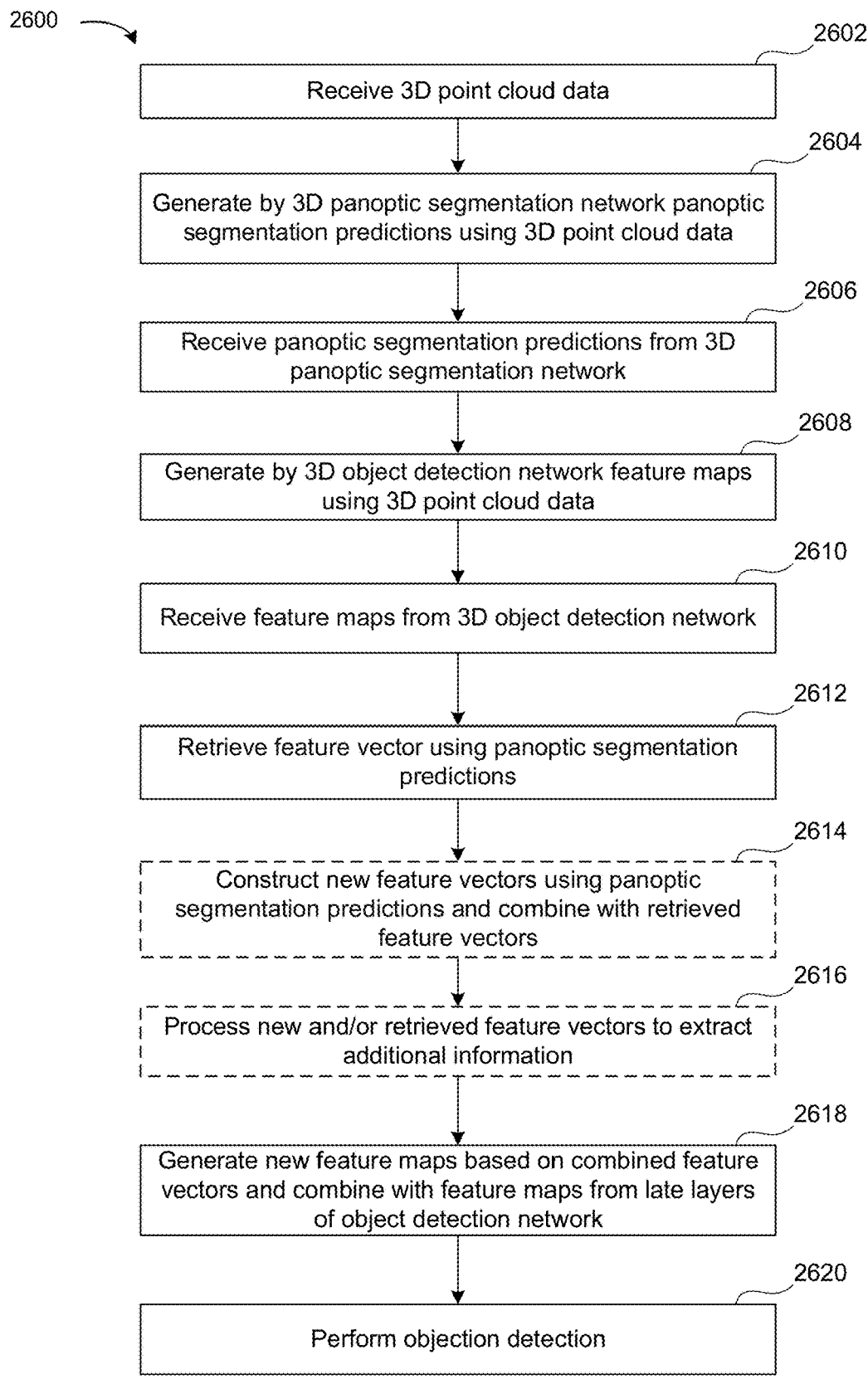
FIG. 26 is a flowchart of a method of 3D object detection in accordance with embodiments of the present disclosure.

Referring now to FIG. 26, a flowchart of a computer-implemented method 2600 of 3D object detection in accordance with one embodiment of the present disclosure will be described. The method 2600 is performed at least in part by the neural network 600 of FIG. 6. The method 2600 may be performed by one or more processing units 102 of the computing system 100 which may have been configured to provide the neural network 600. The method 2600 is used at inference time for a trained neural network 600.

At step 2602, 3D point cloud data 502 is received by the neural network 600. The 3D point cloud data 502 is received from a LiDAR sensor (or unit) of an autonomous driving vehicle which is senses an environment surrounding the autonomous driving vehicle. The 3D point cloud data 502 represents a state of the environment of the surrounding the autonomous driving vehicle (also referred to a scene) at a point in time t. The 3D point cloud data 502 may be obtained from a single observation at time t.

At step 2604, the 3D point cloud data 502 is processed by the 3D panoptic segmentation network 620 of the network 600 which generates panoptic segmentation predictions 504 using the 3D point cloud data 502. The panoptic segmentation predictions 504 may including one or a combination of an instance mask, a center density map or a sematic probability map.

At step 2606, the panoptic segmentation predictions 504 from the 3D panoptic segmentation network 620 are sent to and received by the IFR module 650.

At step 2608, the 3D point cloud data 502 is processed by the 3D object detection network 610 of the network 600 which generates feature maps 506, 510 using the 3D point cloud data 502.

At step 2610, intermediate multi-resolution feature maps 506 feature maps from one or more early layers of the 3D object detection network 610 are sent to and received by the IFR module 650.

Feature Vector Retrieval

At step 2612, the IFR module 650 performs feature vector retrieval using the panoptic segmentation predictions 504 of the 3D panoptic segmentation network 620. In this step, feature vectors are retrieved from the intermediate multi-resolution feature maps 506 at a plurality of relevant locations (voxels or pillars), producing a feature vector for each location. To determine the relevant locations, the IFR module 650 relies on the received panoptic segmentation predictions 504 of the 3D panoptic segmentation network 620 using a center density map or the instance masks.

Figure 7:
FIG. 7 is a schematic diagram illustrating center density map and instance masks used by embodiments of the present disclosure.

FIG. 7 is a schematic diagram illustrating center density map and instance masks. Center density maps are constructed by the 3D panoptic segmentation network 620 from the 3D point cloud data 502 based on the instance center offset by shifting each instance point using the respective instant center offset value. For example, referring to FIG. 7 as an example, the center density maps are generated by shifting each foreground point (shown as grey pixels on left side of FIG. 7) to its respective predicted bounding box center (blue pixels on left side of FIG. 7) by its predicted center offset and counting the number of shifted points at each location. A location with a higher value (bright pixels on the center density map) means there is a higher probability that the bounding box center is at that location. A location with a value of zero (black pixels on the center density map) means that the 3D panoptic segmentation network 620 predicts that the bounding box center does not exist at that location. The center density map can optionally be normalized so the values are between 0 and 1.

The instance masks provide the locations of each instance (i.e., object instance) predicted by the 3D panoptic segmentation network 620. The instance mask can be stored as an array of length A, where A is the number of points in the 3D point cloud 502. Each element of the array contains the Cartesian coordinate of the location and the instance ID that is unique for each instance. In the instance masks in FIG. 7, each instance ID can be visually represented by a unique color.

Figure 8:
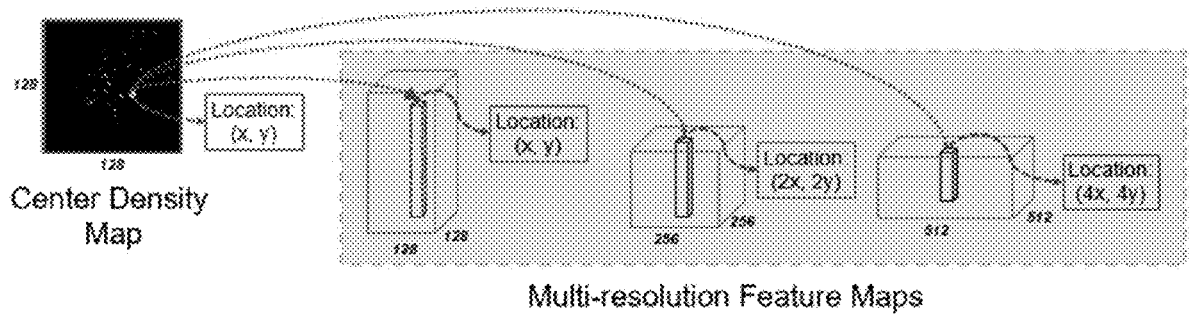
FIG. 8 is a schematic diagram illustrating an example of a predicted center on a single-resolution 2D center density map and its corresponding feature vectors in multi-resolution feature maps.

Both the center density map and instance masks can be constructed with multiple resolutions so that the resolutions match those of feature maps from the CNN of the 3D object detection network 610. For example, instance masks or a center density map can be in 3D with a high resolution that matches a set of high-resolution 3D feature maps from a 3D CNN layer of the 3D object detection network 610. Another set of instance masks or center density map can be in 2D with a coarse resolution that matches a set of coarse-resolution 2D feature maps from a 2D CNN layer. Alternatively, as illustrated in FIG. 8, the instance masks or center density map of the 3D object detection network 610 can be constructed at a single resolution, and scaled by different factors to match the resolutions of feature maps from the CNN. FIG. 8 illustrates a predicted center (with coordinate (x, y)) on a single-resolution 2D center density map and its corresponding feature vectors in multi-resolution feature maps.

Figure 9:
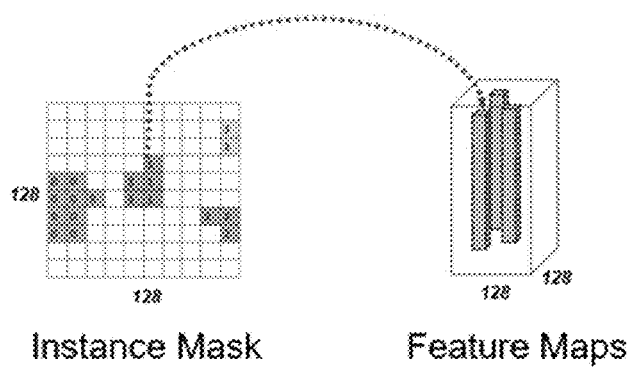
FIG. 9 is a schematic diagram illustrating an example of an instance on a 2D instance mask and its corresponding feature vectors on the feature maps.
Figure 12:
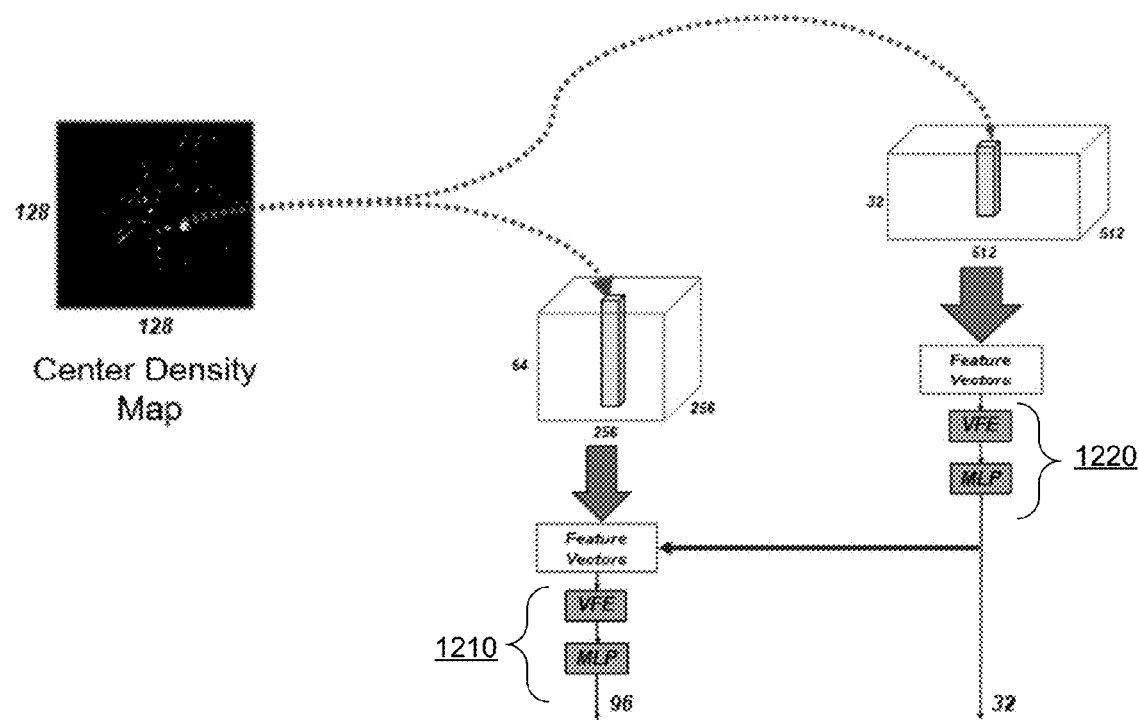
FIG. 12 is a schematic diagram illustrating an example of a processed feature vector in one resolution being used to augment the feature vector in another resolution.
Figure 13:
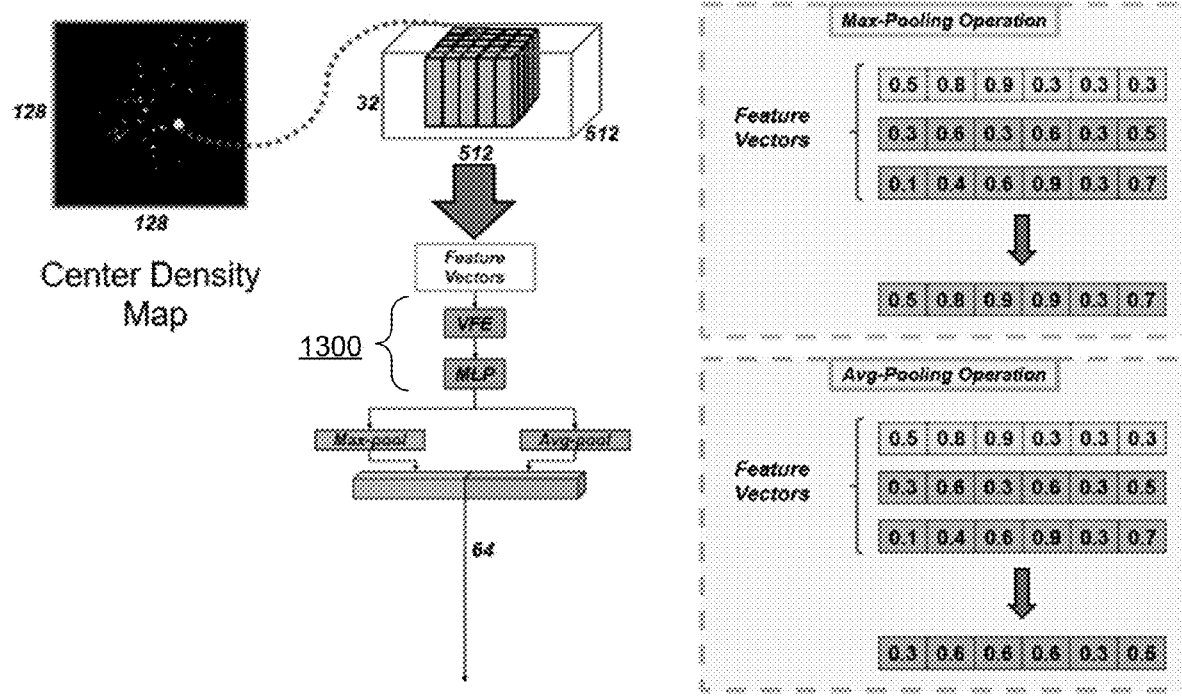
FIG. 13 is a schematic diagram illustrating an example of a feature vector representing a predicted center on the center density map.

When selecting locations to extract features from, all locations indicated by the instance masks or center density map can be selected. Alternatively, a subset of all locations indicated by the instance masks or center density map can be selected for increased efficiency. A subset of location may be selected, for example, by sampling. For example, for instance masks, all locations for each instance according to the instance masks can be selected, randomly sampled B locations for each instance can be selected as illustrated in FIG. 9, the first B locations that are closest to a mean location (later referred to as a mass center) for each instance can be selected. FIG. 9 illustrates an example of an instance (ID 1, with locations in pink) on a 2D instance mask and its corresponding feature vectors on the feature maps. The instance spans across five locations, but only three of the locations are selected randomly to represent the feature vectors for the instance. For a center density map, locations that have a non-zero center density value indicated in the center density map may be selected, locations that have a center density value above a predetermined threshold may be selected, or locations having a local-maxima may be selected. Features associated with the selected locations of interest are then retrieved from the multi-resolution feature maps 506 from the CNN (either 2D CNN, 3D CNN, or a combination of both) of the 3D object detection network 610 as feature vectors for the next component (or step) of the IFR module 650 using suitable neural network (which may comprise a VFE and/or MLP modules as shown in the examples of FIGS. 12 and 13, for example) to process the feature vectors further.

Figure 10:
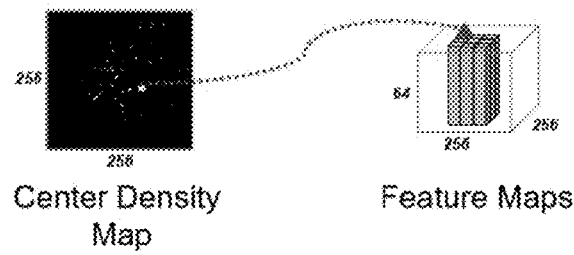
FIG. 10 is a schematic diagram illustrating an example of a predicted center on a 2D center density map and its corresponding feature vectors on the feature maps.

Neighboring locations associated with each instance of the instance masks or each predicted center on the center density maps may optionally also be considered. To do this, a fixed kernel (such as a D×E region) or a dynamic kernel (such as taking the F nearest locations occupied by LiDAR points) can be applied around the mass center for each instance (for instance masks) or for each predicted center (for center density map) and features extracted from these neighboring locations covered by the kernel. An example that illustrates this is in FIG. 10. FIG. 10 is an example of a predicted center (yellow location) on a 2D center density map and its corresponding feature vectors on the feature maps. A 3×3 kernel is applied to incorporate the feature vectors (shown in grey on feature maps) at the neighboring locations. A total of 9 feature vectors are associated with the predicted center in yellow. Neighboring features may also be useful for guiding the object detection head and thus may also be compiled and sent to the next component (or step) of the IFR module 650.

If feature vectors are extracted from 3D locations (one feature vector for each voxel) but the output of the IFR module 650 are to be 2D feature maps, features from different voxels across the height dimension can be summarized or encoded into one set of features for each pillar by max-pooling (taking the maximum features across voxels), average-pooling (taking the mean of features across voxels), reshaping to remove the height dimension, or feature encoding (using a learnable neural network, such as an MLP). The resulting feature vectors from 2D locations (one feature vector for each pillar) can be used in the next component (or step) of the IFR module 650.

Feature Vector Construction

At step 2614, the IFR module 650 optionally performs feature vector construction (or generation). The feature vectors may be hand-crafted or encoded. Hand-crafted feature vectors are generated based on rules-based feature extraction methods developed through human experience rather than being learned or optimized from data. In contrast, encoded feature vectors are generated based on feature extraction methods learned or optimized from data. In this step, new feature vectors are generated and combined with the retrieved feature vectors. Step 2614 is optional and may be omitted in other embodiments.

A set of retrieved feature vectors and the associated location coordinates of the feature vectors can be received from their respective feature maps. To enrich the retrieved feature vectors with more useful information, each retrieved feature vector may be augmented with one or more additional embeddings. Examples of the additional embeddings include but are not limited to the locations of the retrieved feature vectors, semantic probability at the locations of retrieved feature vectors, and center density at the locations of the retrieved feature vectors. For example, new feature vectors may be generated based one or a combination of locations of the retrieved feature vectors, semantic probability at the locations of retrieved feature vectors, or center density at the locations of the retrieved feature vectors.

Figure 11:
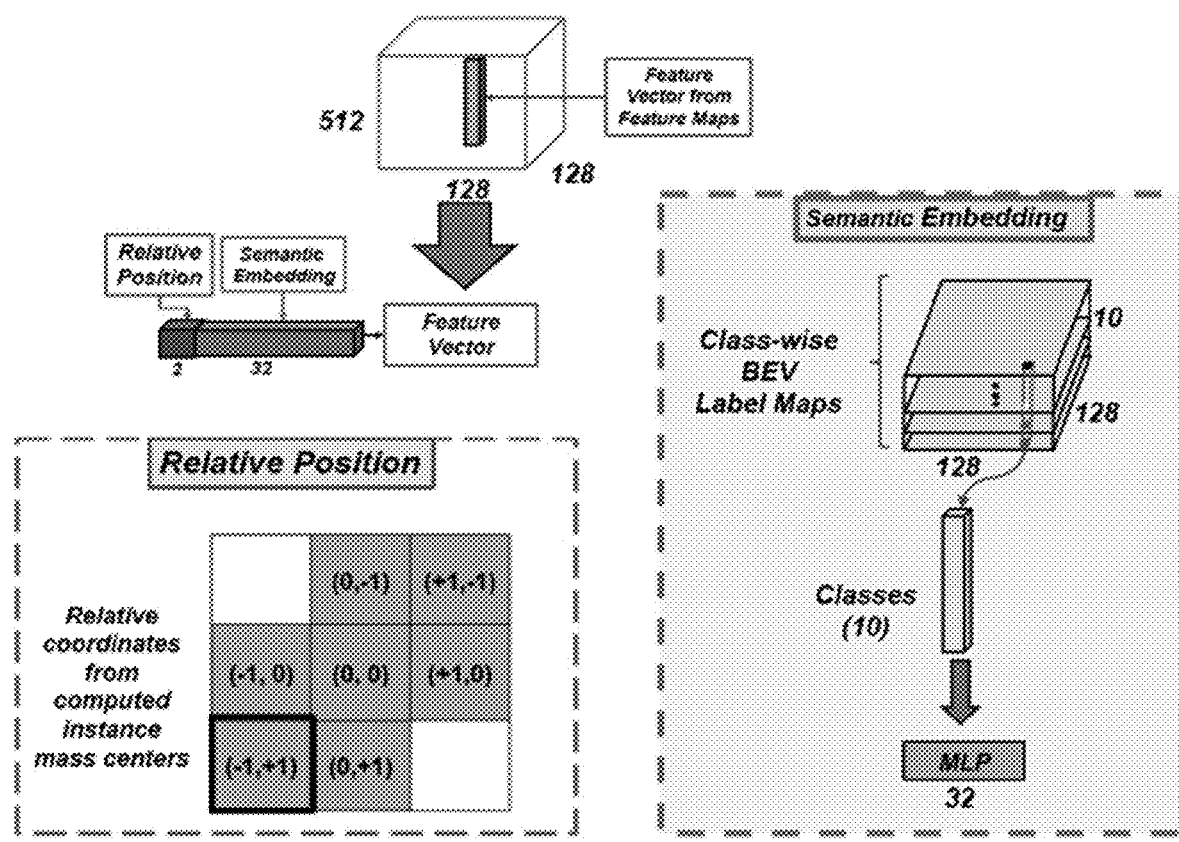
FIG. 11 is a schematic diagram illustrating an example of a location for an instance on a 2D instance mask.

The location coordinates of the retrieved feature vectors can be used to compute useful information. For example, if retrieved feature vectors are retrieved from locations indicated by the instance mask, the mass center of an instance can be computed given the coordinates of all locations for the instance. The relative position between each location and its associated mass center can then be computed. An example of a feature vector that incorporates this relative coordinate vector is illustrated in FIG. 11. FIG. 11 is a schematic diagram illustrating an example of a location for an instance (pink pillar) on a 2D instance mask. The feature vector for the location is constructed by a concatenation of a size-512 feature vector from feature maps, a size-2 relative coordinates computed from the instance mass center, and a size-32 semantic embedding computed by an MLP based on the semantic probability vector at the locations. The relative position for each location from the mass center provide clues of the overall geometry of the instance. In another example, if feature vectors are retrieved from the predicted centers of the center density map and its neighboring locations, the position between each predicted center and its associated neighboring locations can be computed as a relative position vector. The relative position vector can be in many forms, such as relative coordinates, Li distance, Euclidean distance, polar distance, or a learned position embedding computed by a dedicated neural network, such as an MLP.

In addition, the semantic probability map from the 3D panoptic segmentation network 620 may also be used to augment the feature vector. The semantic probability map contains the semantic probability vector for each location, which is a vector of size G that predicts the likelihood that the 3D point cloud 502 in a specific location belongs to each of G classes. Similar to the relative position vector, the semantic vector can be constructed by taking the semantic probability vector of size G directly or by computing a learned semantic embedding using a dedicated neural network, such as an MLP. An example of a feature vector that incorporates a learned semantic embedding is also illustrated in FIG. 11.

Alternatively, the center density value for each location may be considered. Center density is the normalized count of 3D points (coordinates) that are shifted to the specific location by the predicted center offset. It can be thought of as the certainty that the location is the center of the object. A higher density can also suggest that the object that the location belongs to is larger in size. Same as the other vectors, a center density vector can be constructed by directly using the center density vector of size 1 for each location, or by computing a learned center density embedding based on the center density vector using a dedicated neural network, such as an MLP.

Overall, the feature vector at each location may not only comprises features extracted from the intermediate multi-resolution feature maps 506 from the CNN of the 3D object detection network 610, but also other useful handcrafted features or prediction results from the 3D panoptic segmentation network 620, which includes but are not limited to the relative position vector, semantic vector, and center density vector discussed above. The new feature vectors at each location can be combined with the retrieved feature vectors at the respective locations through concatenation, adding, multiplication, etc.

Feature Vector Abstraction

At step 2616, the IFR module 650 optionally performs feature vector abstraction in which the feature vectors from previous steps are further processed to extract meaningful or useful information. Step 2616 is optional and may be omitted in other embodiments. In step 2616, the feature vectors output from the feature vector retrieval step 2612 or the feature vector construction step 2614 are augmented with additional information by further processing the feature vector with a learnable neural network. The learnable neural network may comprise one or more MLPs, linear layers, VFEs, etc. This provides useful information to guide the 3D object detection network 610 in later steps.

The learnable neural network may take in the combined feature vectors from the intermediate multi-resolution feature maps 508 or may be divided into separate neural networks so that each processes feature vectors from a particular resolution of feature maps. In the latter case, processed feature vectors from feature maps of a particular resolution that have passed through their separate neural network may optionally be combined with unprocessed feature vectors from feature maps of another resolution before being processed by their respective neural network in a cascading fashion. An example that uses this strategy is shown in FIG. 12, which illustrates an example of a processed feature vector in one resolution being used to augment the feature vector in another resolution. In FIG. 12, feature vectors from two different resolutions of feature maps have their respective neural networks denoted by references 1210 and 1220, each neural network comprising a VFE and an MLP. The neural network 1210 processes 256×256 resolution feature maps whereas the neural network 1220 processes 512×512 resolution feature maps. A cascade connection (shown as the arrow in blue) uses the processed feature vector from the neural network 1220 for an extracted feature (e.g., a predicted center location on a center density map) from the 512×512 resolution feature maps to augment the unprocessed feature vector for the 256×256 resolution feature maps via concatenation. This cascading strategy connects the separate neural networks 1210 and 1220 together, and allows information from features collected at one resolution to help extract features in another resolution, augmenting the feature extraction process for certain resolutions Before or after the feature vectors are processed by the respective neural network, the feature vectors may optionally be grouped and summarized. In one example, feature vectors from different locations of an instance (according to the instance masks) can be grouped together, and either go through another convolutional layer, MLP, or pooling layer, or simply combine through a concatenation, element-wise addition, or element-wise multiplication to generate a single feature vector representing the instance. In another example, if neighboring locations around the predicted centers on the center density map are considered, the feature vectors of each predicted center and its associated neighboring locations can be grouped together and go through a similar process as the prior example to generate a single feature vector representing the extracted feature (e.g., predicted center location). An example of this is shown in FIG. 13, which illustrates an example of a feature vector representing the extracted feature (e.g., a predicted center location on the center density map) generated by processing the feature vectors from the center location and its neighboring locations individually by a VFE and MLP and grouping into one summarized feature vector via max-pooling and average-pooling operations. After feature vectors of the predicted center and its neighboring locations are processed by the neural network 1300, a max-pooling and an average-pooling operations are applied for each feature channel across the features vectors, grouping and summarizing the feature vectors into one size-64 feature vector representing the predicted center.

Network Augmentation

At step 2618, in the final component/step of the IFR module 650, the IFR module 650 performs network augmentation in which the feature vectors from previous components/steps are used to construct a new set of feature maps which are passed to the rest of the 3D object detection network 610 to guide the object detection predictions to augment the rest of the 3D object detection network 610. A set of feature maps with a feature depth the same as the size of feature vectors is constructed and initialized with all zero values. Each feature vector can then be inserted to the feature maps at its corresponding location. In the case that a single feature vector is generated for each instance, the instance masks that correspond to the resolution of the new set of feature maps constructed can be relied upon, and the same feature vector can be used for all locations that belong to the instance.

After the new set of feature maps are constructed, the new set of feature maps are then be processed by the rest of the 3D object detection network 610. The feature maps output from the IFR module 650 are inserted by combining with the original feature maps that are fed to the remaining 3D object detection network 610 as long as the resolution of the feature maps match. If the IFR module 650 output contains feature maps at multiple resolutions, the feature maps can be inserted to different layers of the remaining 3D object detection network 610 that have input feature maps that match the resolutions. The insertion can be done through concatenation, element-wise addition, element-wise multiplication, etc. with the original feature maps that are fed to the remaining 3D object detection network 610.

Figure 14:
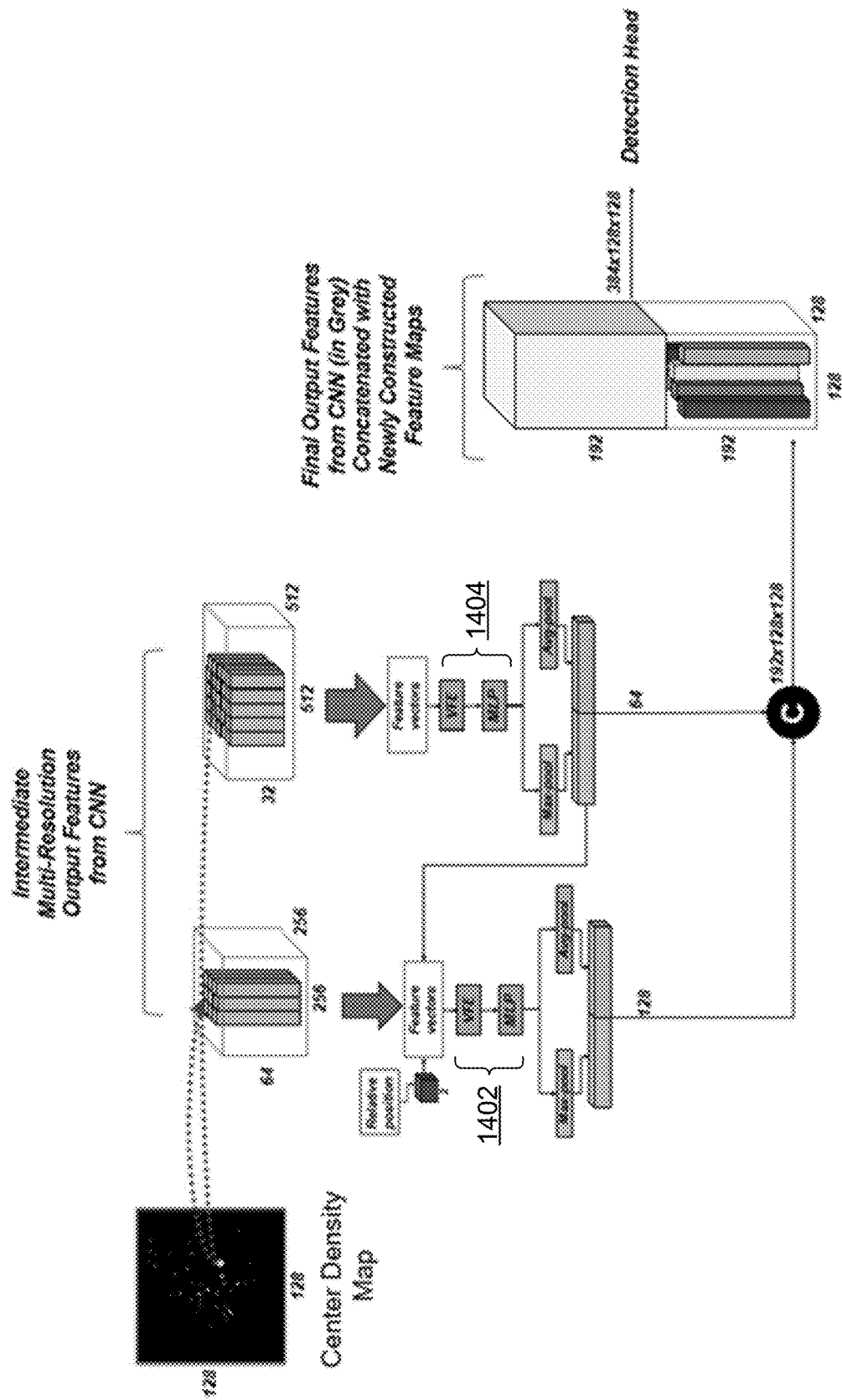
FIG. 14 is a schematic diagram illustrating an example of network augmentation.

An example of network augmentation based on the center density map is shown in FIG. 14. Processed feature vectors at different locations of predicted centers are concatenated and assembled in a new set of feature maps (on bottom right, each colored pillar represents a processed feature vector for a specific predicted center). The new set of feature maps are then concatenated with the final output features from CNN (in grey on bottom right) and fed to the object detection head. After the extraction of feature vectors from intermediate multi-resolution feature maps 506 of the CNN of the 3D object detection network 610, the intermediate multi-resolution feature maps 506 are processed by respective neural networks 1402 and 1404 which output processed feature vectors. The processed feature vectors are then concatenated and assembled in a new set of feature maps. In the new set of feature maps, only the locations that correspond to the predicted centers have features, while the other locations are filled with zeros. The new set of feature maps is then concatenated with the final output features from CNN of the 3D object detection network 610, which in this example is the original input for the object detection head. The combined feature maps are then fed to the object detection head.

The additional set of feature maps from the output of the IFR module 650 provide helpful information about objects in the scene that are detected by the 3D panoptic segmentation network 620 and also identify the locations of those objects.

At step 2620, object detection predictions are generated from the combined feature maps using the 3D object detection network 610. The combined feature maps are new feature maps based on the retrieved feature vectors and the feature maps from the one or more late layers of the object detection network. The new feature maps may be generated from the retrieved feature vectors and new feature vectors generated during feature vector construction. The new feature maps may also be generated from processed feature vectors or unprocessed feature vectors, the processed feature vectors or unprocessed feature vectors may be based on retrieved feature vectors or a combination of retrieved feature vectors and new feature vectors.

EXAMPLE EMBODIMENTS

The IFR module 650 can be implemented in multiple ways by selecting different options available for each component/step. Three example embodiments of the IFR module and evaluations of the example embodiments are described below. In all three example embodiments, the 3D object detection network 610 is either the 3D object detection network of SECOND or the 3D object detection network in the single-stage of CenterPoint while the 3D panoptic segmentation network 620 used is a modified version of the 3D panoptic segmentation network in CPSeg. However, the IFR module 650 is designed to work with other grid-based 3D object detection networks and other 3D panoptic segmentation networks. The first example embodiment is a center-based approach that leverages the center density map to retrieve and process multi-resolution features. The second example embodiment and third example embodiment are instance-based approaches that leverage the instance masks. For the first example embodiment, the 3D panoptic segmentation network is supervised to regress the bounding box centers while for the second and third example embodiments the 3D panoptic segmentation network is supervised to regress the instance mass centers.

Example Embodiment 1—Center-Based Approach

Figure 15:
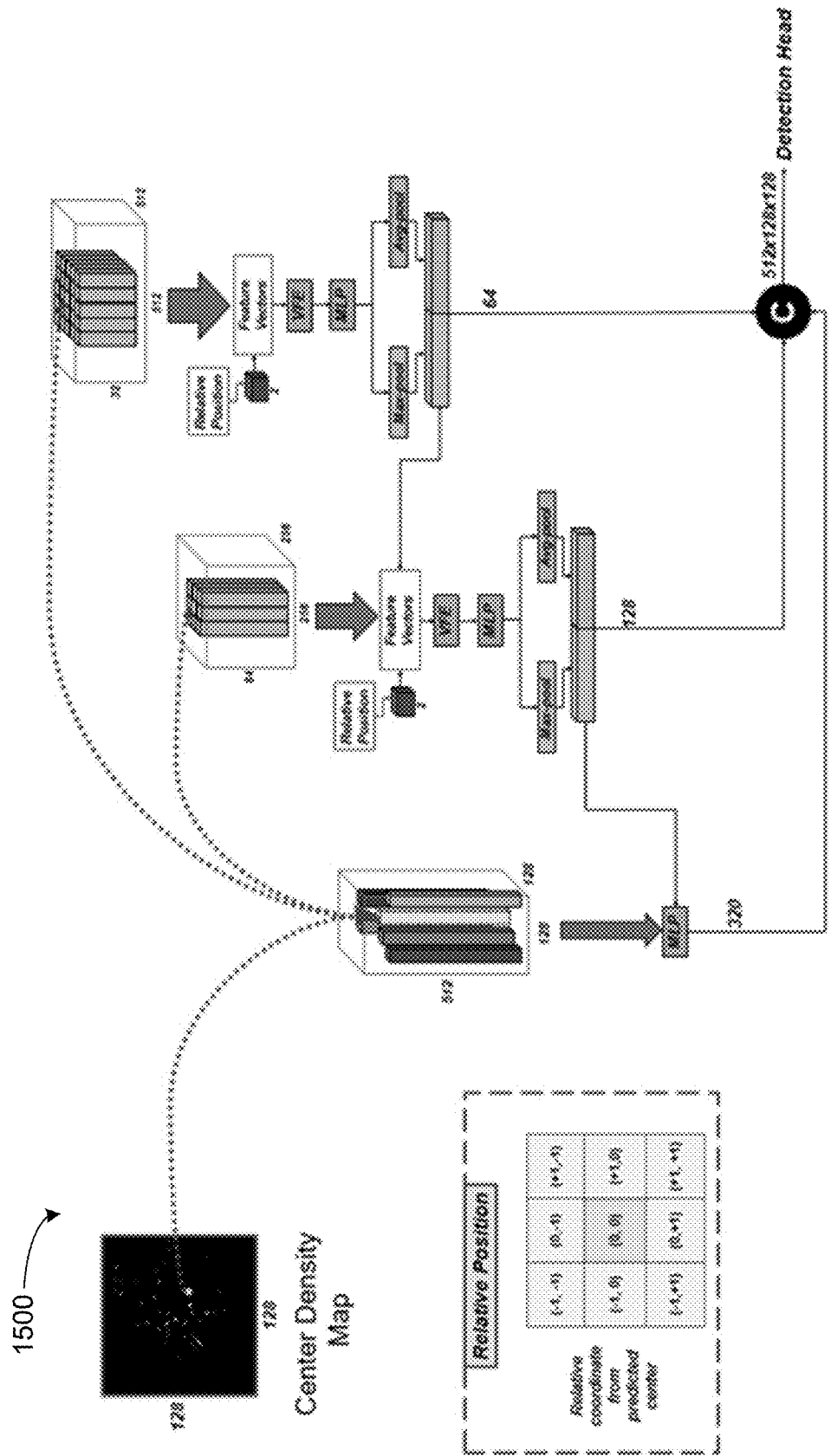
FIG. 15 is a schematic diagram of a first example embodiment of an IFR module in accordance with the present disclosure.

FIG. 15 is a schematic diagram of the first example embodiment of an IFR module 1500 in accordance with the present disclosure. The IFR module 1500 leverages the center density map. In the feature vector retrieval step, a center density map of size 128×128 is used and all locations that are predicted as centers (with non-zero center density value) are used to extract feature vectors. Three sets of multi-resolution 2D feature maps are used to extract feature vectors including a set of 32 512×512 (each location has a size-32 feature vector) feature maps obtained from a 3D CNN, a set of 64 256×256 feature maps from the 3D CNN, and a set of 512 128×128 feature maps obtained from the output of a 2D CNN. The output of the 3D CNN originally contains feature vectors for each 3D voxel but average-pooling is applied across voxels in the height dimension to reduce complexity, resulting in the formation of a feature vector for each BEV location that summarizes information from all voxels that make up the pillar. For the 128×128 feature maps, the feature vectors are extracted directly using the coordinates of the non-zero locations from the center density map. For the other higher resolution feature maps, the feature vectors are extracted using the coordinates of the non-zero locations from the center density map multiplied by a corresponding scaling factor (2 for 256×256 feature maps and 4 for 512×512 feature maps). To consider more relevant locations, for the 256×256 and 512×512 feature maps, local kernels are applied with size 3×3 and 5×5, respectively, around each predicted center location (non-zero locations of the center density map). The feature vectors are covered by the kernels as well.

In the feature vector construction step, feature vectors that are from the predicted centers and the neighboring locations are further augmented by concatenating with a relative position vector which contains 2-dimensional relative coordinates between each location and its corresponding predicted center. A predicted center itself will have a relative position vector of [0, 0].

In the feature vector abstraction step, feature vectors coming from a specific resolution of feature maps have a corresponding neural network to process them. Starting from the highest resolution features (from 512×512 feature maps), each set of 25 feature vectors (from a predicted center and its neighboring locations) is fed into a VFE and subsequently an MLP for further feature extraction. The set of 25 feature vectors are then summarized to one feature vector with size 64 through max-pooling and average-pooling. After each predicted center obtains a feature vector of size 64, the feature vector abstraction for the 512×512 feature maps is complete, and the discarded features from the 3D CNN are recovered and processed.

For the 256×256 feature maps, a similar feature learning process takes place. The main difference is that the feature vectors from one predicted center and its neighboring locations are each concatenated with the processed feature vector from the 512×512 feature maps that corresponds to the predicted center using a cascade connection. The set of 9 feature vectors this time are then fed to a VFE and MLP, and then summarized to one feature vector with size 128. The same process applies for feature vectors associated with the other predicted centers.

For the 128×128 feature maps, neighboring locations of the predicted centers are not considered. The feature vector from each predicted center is concatenated with the processed feature vector from the 256×256 feature maps that corresponds to the predicted center using the cascade connection. Each feature vector then passes through an MLP, generating a different feature vector with size 320 for each predicted center location.

In the network augmentation step, a set of feature maps with dimension 512×128×128 is created and initiated with all zeros. Then, for each predicted center, a size-64 feature vector from the 512×512 feature maps, a size-128 feature vector from the 256×256 feature maps, and a size-320 feature vector from the 128×128 feature maps are concatenated and inserted into the 512×128×128 feature maps at its corresponding location based on the center density map. The newly constructed feature maps are then concatenated with the output of 2D CNN and fed to the object detection head.

Example Embodiment No. 2—Instance-based Approach with Semantic Embedding

Figure 16:
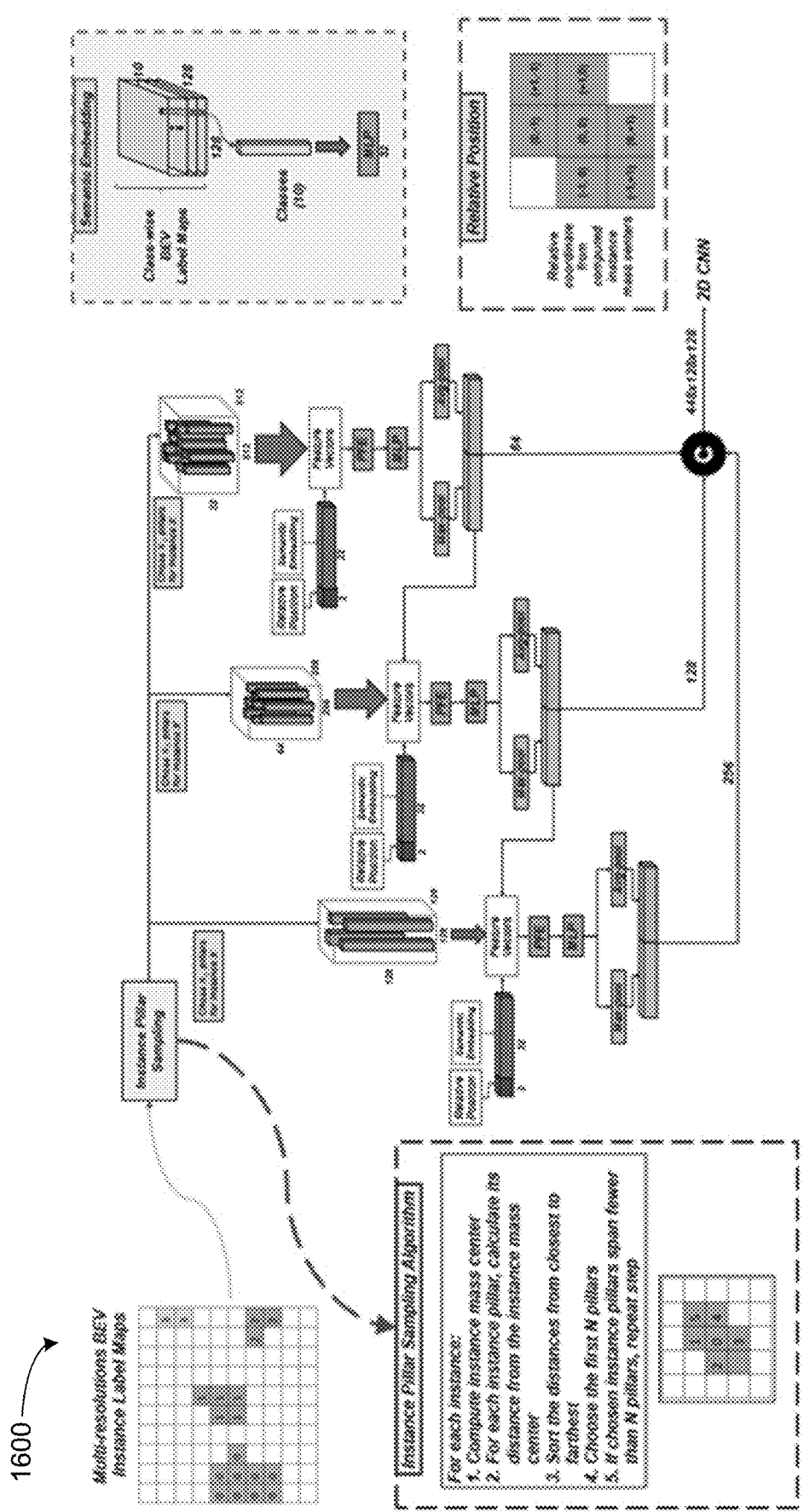
FIG. 16 is a schematic diagram of a second example embodiment of an IFR module in accordance with the present disclosure.

FIG. 16 is a schematic diagram of the second example embodiment of an IFR module 1600 in accordance with the present disclosure. The IFR module 1600 leverages the instance masks and the semantic probability map. in the feature vector retrieval step, instance masks of size 512×512, 256×256, and 128×128 are used. Three corresponding, multi-resolution sets of 2D feature maps are used to extract feature vectors, including a set of 32 512×512 (each pillar location has a size-32 feature vector) feature maps, a set of 64 256×256 feature maps, and a set of 128 128×128 feature maps, all from the 3D CNN. For each resolution of feature maps, the feature vectors are extracted directly using the coordinates of non-zero locations of the instance masks. To reduce the computation, 25, 16, and 9 locations are sampled for each instance from the 512×512, 256×256, and 128×128 feature maps, respectively. To sample the locations for each instance, locations that closer to the mass center are prioritized (computed by averaging the coordinates of all locations for the instance).

In the feature vector construction step, feature vectors are further augmented by concatenating with a relative position vector, which comprises 2-dimensional relative coordinates between each location and its corresponding computed mass center. In addition, feature vectors for each instance are each joined with a semantic embedding computed for the instance through concatenation. The semantic embedding is constructed by first obtaining a size-10 mean semantic probability vector across all locations in the instance, and subsequently passing the mean semantic vector to an MLP to obtain a size-32 semantic embedding.

In the feature vector abstraction step, feature vectors coming from a specific resolution of feature maps have a corresponding neural network to process them. The processing of features for 512×512 feature maps and 256×256 feature maps follow the first example, but instead of providing a feature vector for each predicted center, it generates a feature vector for each instance. For the 128×128 feature maps, 9 sampled feature vectors from one instance are each concatenated with the processed feature vector from the 256×256 feature maps that corresponds to the instance, and then passes through a VFE and an MLP, generating a different feature vector with size 256 for each instance.

In the network augmentation step, a set of feature maps with dimension 448×128×128 is created and initiated with all zeros. Then, for each instance, a size-64 feature vector from the 512×512 feature maps, a size-128 feature vector from the 256×256 feature maps, and a size-256 feature vector from the 128×128 feature vector are concatenated and inserted into the 448×128×128 feature maps at its corresponding location based on the instance masks. The newly constructed feature maps are then concatenated with the output of the 3D CNN and then fed to the 2D CNN.

Example Embodiment No. 3—Instance-Based Approach

Figure 17:
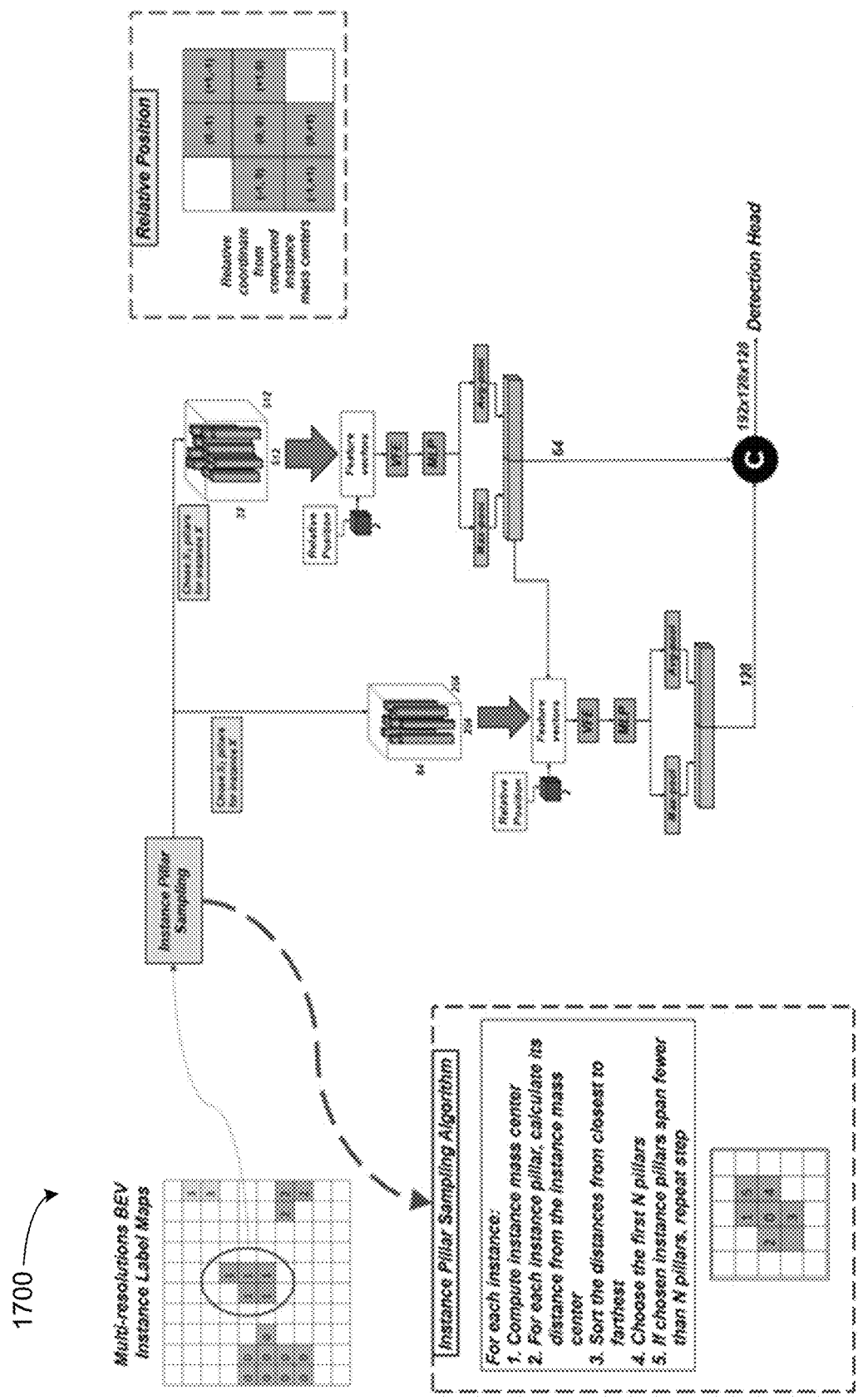
FIG. 17 is a schematic diagram of a third example embodiment of an IFR module in accordance with the present disclosure.

FIG. 17 is a schematic diagram of the third example embodiment of an IFR module 1700 in accordance with the present disclosure. The IFR module 1700 leverages the instance masks and is similar to the IFR module 1600 of the second example embodiment with some differences. First, in the feature vector retrieval step, only features from 512×512 feature maps and 256×256 feature maps are considered. Second, in the feature vector construction step, the semantic embedding is not computed or used. Third, in the feature vector abstraction step, there is no process of features from 128×128 feature maps. Last, in the network augmentation step, a set of 192×128×128 feature maps are constructed instead. The newly constructed feature maps are then concatenated with the output of the 2D CNN and then fed to the object detection head.

Training

The IFR module 650, combined with a 3D panoptic segmentation network 620, functions as an attachment to the 3D object detection network 610 to improve the prediction accuracy of object detection. The IFR module 650 leverages the output of the 3D panoptic segmentation network 620 to determine relevant locations of a scene captured by a LiDAR sensor, then retrieves and processes the features from intermediate, multi-resolution feature maps 506 of the 3D object detection network 610 at those relevant locations. The features are used to construct a new set of feature maps that can be used to augment the rest of the 3D object detection network 610.

The combined network 600 comprising the IFR module 650, 3D object detection network 610 and 3D panoptic segmentation network 620 can be trained jointly using supervised learning using a joint loss function. Examples of a joint loss function include but are not limited to the focal loss and smooth L1 loss for 3D object detection, and weighted cross entropy loss, Lovász softmax loss, total variation loss, and L2 regression loss for 3D panoptic segmentation. Alternatively, the 3D panoptic segmentation network 620 can be trained separately, and the 3D panoptic segmentation network 620 with trained weights can be incorporated into the combined network 600.

Advantages

The system and method of the present disclosure effectively reduces the loss of information from down-sampling and provides rich information that augments the 3D object detection network by leveraging guidance from the 3D panoptic segmentation network. Specifically, in the feature vector retrieval step, the system and method of the present disclosure successfully recovers certain multi-resolution features, defined by feature vectors, at locations that are deemed important by the 3D panoptic segmentation network, which may be the locations of the predicted centers, individual instances, as well as their surroundings. These multi-resolution feature vectors come from multi-resolution feature maps computed by different layers of CNN.

In the feature vector construction step, the recovered features are injected with more helpful information related to the properties of each instance, such as its geometry, class, and size, leveraging the output of 3D panoptic segmentation network to provide more helpful information to the 3D object detection network.

In the feature vector abstraction step, the recovered features are further processed to allow them to be more adaptable for the rest of the 3D object detection network. Each instance or each predicted center can have its own summarized feature vector, which can be used help the 3D object detection network develop awareness to differentiate between instances or between predicted centers.

In the network augmentation step, the recovered features are constructed into a new set of feature maps so the new set of feature maps are able to be re-used by the rest of the 3D object detection network. Having non-zero features only in the locations related to instances, the feature maps highlight the presence of individual instances and provide useful guidance for the 3D object detection network.

Compared with the prior art, the system and method of the present disclosure recovers information at multiple resolutions instead of a single resolution, which minimizes the information loss. The system and method of the present disclosure recovers information at locations determined by the final output of 3D panoptic segmentation network instead of the intermediate, unrefined output of 3D object detection network, which is more accurate and informative. Optionally, the system and method of the present disclosure may leverage panoptic segmentation output to provide each recovered feature vector with useful embedding, which is unavailable previously. Perhaps most importantly, the system and method of the present disclosure uses the feature maps to augment the 3D object detection network, especially influencing the object detection head to make better detections with higher recall and precision. In contrast, the refinement network only refines the already made detections, which may result in a higher precision but not a higher recall. Finally, the system and method of the present disclosure is adaptable as it is designed to work with different grid-based 3D object detection methods.

As shown in the FIGS. 18, 19, and 20, an evaluation was performed for each of the three example embodiments on the nuScenes validation dataset described by Holger Caesar, Varun Bankiti, Alex H. Lang, Sourabh Vora, Venice Erin Liong, Qiang Xu, Anush Krishnan, Yu Pan, Giancarlo Baldan and Oscar Beijbom in "*nuScenes: A Multimodal Dataset for Autonomous Driving*", CVPR 2020, arXiv: 1903.11027, May 3, 2020, computing the nuScenes Detection Score (NDS) and mean average precision (mAP) for each approach. A higher NDS and mAP show that the 3D object detection network has a better prediction accuracy. The embodiments in FIG. 18 use the single-stage Center-Point as the 3D object detection network. The embodiment in FIG. 19 uses the SECOND while the embodiment in FIG. 20 uses the PointPillars. The baseline embodiment in row 2 of FIG. 18 is based on a multi-task framework that connects the single-stage CenterPoint and CPSeg via a shared 3D CNN, but without the IFR module of the present disclosure. It can be seen that all three example embodiments of the IFR module of the present disclosure improve the NDS and mAP considerably, regardless of the 3D object detection network used.

Additional Applications

Although the main use of the present disclosure is presented for the autonomous vehicle systems, it can be applied to other domains such as robotics, surveillance system and cellphone where the main input source is the sparse point cloud. The system of the present disclosure helps to better learn object instance information of the environment and helps such systems to perform better with higher confidence and less computational cost.

In addition, the system of present disclosure can be applied to 2D image domain such as RGB images captured by camera. In this case, both the panoptic segmentation network and object detection network can be selected using off-the-shelf 2D methods, and the feature augmentation can take place based on multi-resolution 2D feature maps.

Example Computing System

Figure 21:
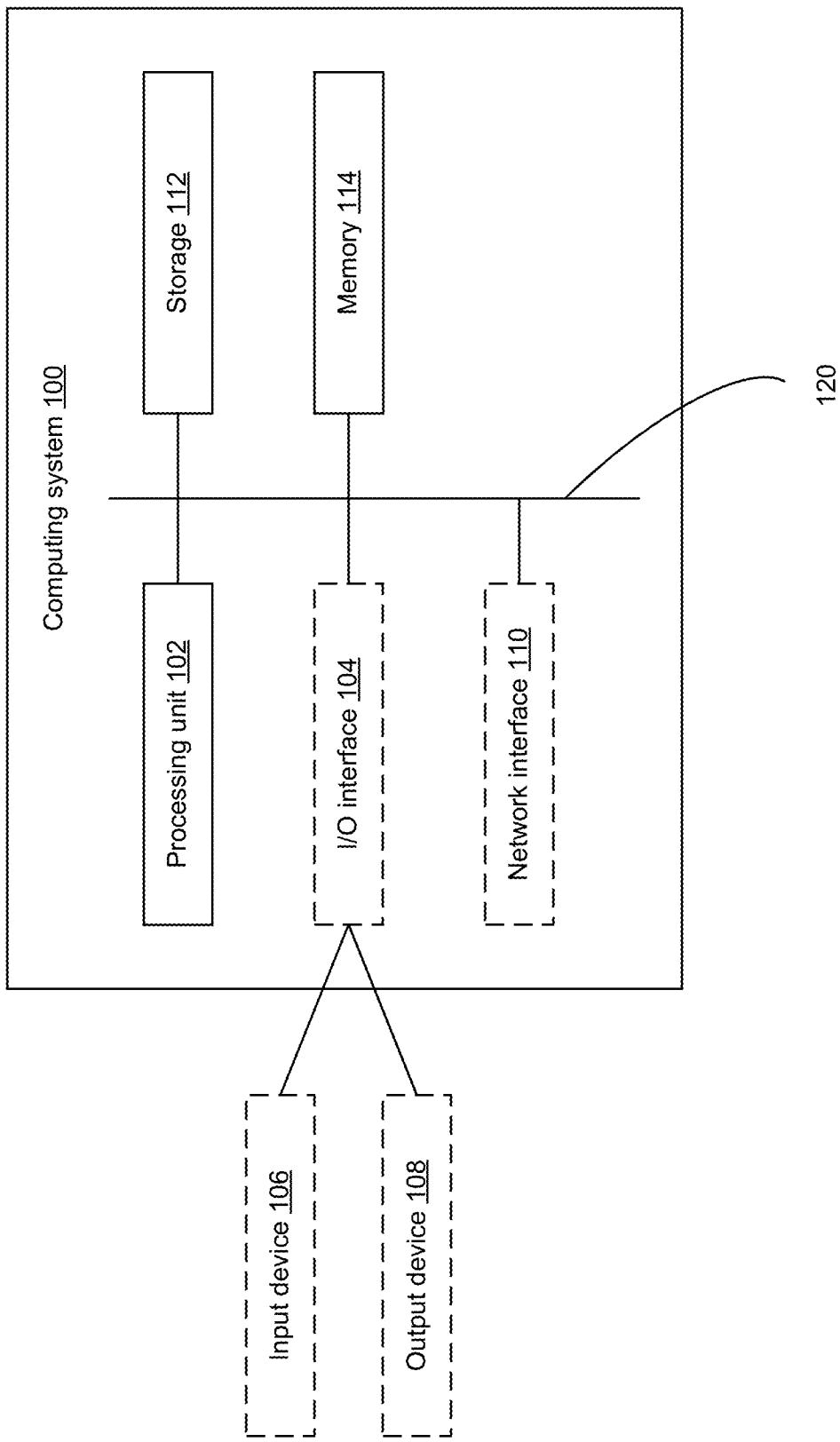
FIG. 21 is a block diagram of an example simplified computing system that may be used in accordance with example embodiments of the present disclosure.

Referring now to FIG. 21, a simplified example embodiment of a computing system 100 suitable for implementing the present disclosure. The present disclosure may be implemented in other computing systems, which may include components different from those discussed below.

Although FIG. 21 shows a single instance of each component, there may be multiple instances of each component in the computing system 100. Further, although the computing system 100 is illustrated as a single block, the computing system 100 may be a single physical machine or device (e.g., implemented as a single computing device, such as a single workstation, single server, etc.), or may comprise a plurality of physical machines or devices (e.g., implemented as a server cluster). For example, the computing system 100 may represent a group of servers or cloud computing platform providing a virtualized pool of computing resources (e.g., a virtual machine, a virtual server).

The computing system 100 includes one or more processing units 102. Examples of a processing unit 102 include a processor, a microprocessor, a digital signal processor, an application-specific integrated circuit (ASIC), a field-programmable gate array (FPGA), a dedicated logic circuitry, a dedicated artificial intelligence processor unit, a central processing unit (CPU), a graphics processing unit (GPU), a tensor processing unit (TPU), a neural processing unit (NPU), a hardware accelerator, or combinations thereof.

The processing unit 102 may perform operations in conjunction with a computing platform. The performance of operations may be distributed among one or more processing units 102, whether residing only within a single machine or deployed across a number of machines. For example, one or more processing units 102 may be located in a single geographic location (e.g. within a home environment, an office environment, or a server farm), or may be distributed across a number of geographic locations.

The computing system 100 may include an optional input/output (I/O) interface 104, which may enable interfacing with an optional input device 106 and/or optional output device 108. In the example shown, the optional input device 106 (e.g., a keyboard, a mouse, a microphone, a touchscreen, and/or a keypad) and optional output device 108 (e.g., a display, a speaker and/or a printer) are shown as optional and external to the computing system 100. In other example embodiments, there may not be any input device 106 and output device 108, in which case the I/O interface 104 may not be needed.

The computing system 100 may include an optional network interface 110 for wired or wireless communication with other computing systems (e.g., other computing systems in a network). The network interface 110 may include wired links (e.g., Ethernet cable) and/or wireless links (e.g., one or more antennas) for intra-network and/or inter-network communications.

The computing system 100 may include a storage unit 112, which may include a mass storage unit such as a solid state drive, a hard disk drive, a magnetic disk drive and/or an optical disk drive. The storage unit 112 may store data, for example.

The computing system 100 may include a memory 114, which may include a volatile or non-volatile memory (e.g., a flash memory, a random access memory (RAM), and/or a read-only memory (ROM)). The non-transitory memory 114 may store instructions for execution by the processing unit 102, such as to carry out example embodiments described in the present disclosure. For example, the memory 114 may store instructions for implementing an agent. The memory 114 may store other software instructions, such as for implementing an operating system and other applications/functions. For example, the memory 114 may store the IFR module as described herein in the form of executable instructions for execution by the processing unit 102.

The computing system 100 may additionally or alternatively execute instructions from an external memory (e.g., an external drive in wired or wireless communication with the server) or may be provided executable instructions by a non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a communication bus 120 providing communication among components of the computing system 100, including the processing unit(s) 102, optional I/O interface(s) 104, network interface 110, storage unit(s) 112 and/or memory(ies) 114. The bus 120 may be any suitable bus architecture including, for example, a memory bus, a peripheral bus or a video bus.

General

The above-noted description makes reference to various documents such as articles and academic papers, the content of these documents is hereby incorporated herein by reference.

Through the descriptions of the preceding embodiments, the present invention may be implemented by using hardware only, or by using software and a necessary universal hardware platform, or by a combination of hardware and software. The coding of software for carrying out the above-described methods described is within the scope of a person of ordinary skill in the art having regard to the present disclosure. Based on such understandings, the technical solution of the present invention may be embodied in the form of a software product. The software product may be stored in a non-volatile or non-transitory storage medium, which can be an optical storage medium, flash drive or hard disk. The software product includes a number of instructions that enable a computing device (personal computer, server, or network device) to execute the methods provided in the embodiments of the present disclosure.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other embodiments are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present invention and its advantages have been described in detail, it should be understood that various changes, substitutions and alterations can be made herein without departing from the invention as defined by the appended claims.

The present invention may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples but should be given the broadest interpretation consistent with the description as a whole.

The invention claimed is:

1. A computer-implemented method of three-dimensional (3D) object detection, the method comprising:
   receiving, from a panoptic segmentation network, panoptic segmentation predictions, the panoptic segmentation network receiving a 3D point cloud as input and outputting the panoptic segmentation predictions, wherein the panoptic segmentation predictions including one or a combination of an instance mask providing locations of each instance, a center density map, instance center offset or a sematic probability map that encodes probabilities of semantic classes for each location;
   receiving, from an object detection network having a plurality of layers, intermediate feature maps from one or more early layers of the object detection network, the object detection network receiving the 3D point cloud as input and outputting feature maps at each layer;
retrieving feature vectors from the intermediate feature maps using the panoptic segmentation predictions; and
combining the retrieved feature vectors with feature maps from one or more late layers of the object detection network for generating object detection predictions.

2. The method of claim 1, wherein the retrieving feature vectors from the plurality of feature intermediate maps using the panoptic segmentation predictions comprises:
selecting one or more locations in the intermediate feature maps for feature vector retrieval based on the instance mask or the center density map; and
extracting feature vectors from the intermediate feature maps at the selected locations.

3. The method of claim 2, wherein all locations indicated by the instance mask or center density map are selected.

4. The method of claim 2, wherein a subset of all locations indicated by the instance masks or center density map are selected for by random sampling.

5. The method of claim 2, wherein a subset of all locations indicated by the instance masks are selected, wherein the subset is a predetermined of locations closest to a mass center for each instance in the instance mask.

6. The method of claim 2, wherein all locations that have a non-zero center density value indicated by the center density map are selected, all locations that have a center density value above a predetermined threshold are selected, or locations having a local-maxima are selected.

7. The method of claim 2, wherein neighboring locations associated with each instance of the instance masks or each predicted center on the center density maps are selected.

8. The method of claim 1, wherein each layer of the object detection network generates feature maps at a specific resolution, wherein the intermediate feature maps comprise multi-resolution feature maps, wherein retrieving feature vectors is performed for each of the intermediate multi-resolution feature maps.

9. The method of claim 8, further comprising:
processing a retrieved feature vector to generate a processed feature vector having additional information; and
combining the processed feature vector for an intermediate feature map at a first resolution with an unprocessed feature vector for an intermediate feature map at a second resolution different from the first resolution.

10. The method of claim 9, wherein the first resolution is higher than the second resolution.

11. The method of claim 9, wherein the processing is performed by a neural network comprising a Voxel Feature Encoder (VFE) and Multi-Layer Perceptron (MLP).

12. The method of claim 9, wherein the processed feature vector is combined with the unprocessed feature vector using a cascade connection.

13. The method of claim 1, further comprising:
grouping retrieved feature vectors representing a single instance into a single feature vector.

14. The method of claim 1, further comprising:
grouping retrieved feature vectors of each predicted center and its associated neighboring locations into a single feature vector.

15. The method of claim 14, wherein the grouping comprises:
processing the retrieved feature vectors from a predicted center location and its neighboring locations to generate processed feature vectors; and
performing max-pooling and average-pooling on the processed feature vectors to generate a single feature vector representing the predicted center location.

16. The method of claim 1, further comprising:
generating new feature vectors based one or a combination of a relative position vector indicating a relative location of each location of the retrieved feature vectors, a semantic vector indicating a semantic probability at each location of retrieved feature vectors, or a center density vector indicating a center density at each location of the retrieved feature vectors; and
combining the retrieved feature vectors with the new feature vectors.

17. The method of claim 1, wherein combining the retrieved feature vectors with feature maps from one or more late layers of the object detection network comprises:
generating new feature maps based on the retrieved feature vectors;
combining the new feature maps with the feature maps from the one or more late layers of the object detection network to generate combined feature maps.

18. The method of claim 17, further comprising:
causing object detection predictions to be generated from the combined feature maps using the object detection network.

19. A computing device, comprising:
one or more processors configured to:
receiving, from a panoptic segmentation network, panoptic segmentation predictions, the panoptic segmentation network receiving a 3D point cloud as input and outputting the panoptic segmentation predictions, wherein the panoptic segmentation predictions including one or a combination of an instance mask providing locations of each instance, a center density map, instance center offset or a semantic probability map that encodes probabilities of semantic classes for each location;
receiving, from an object detection network having a plurality of layers, intermediate feature maps from one or more early layers of the object detection network, the object detection network receiving the 3D point cloud as input and outputting feature maps at each layer;
retrieving feature vectors from the intermediate feature maps using the panoptic segmentation predictions; and
combining the retrieved feature vectors with feature maps from one or more late layers of the object detection network for generating object detection predictions.

20. A non-transitory machine-readable medium having tangibly stored thereon executable instructions for execution by one or more processors, wherein the executable instructions, in response to execution by the one or more processors, cause the one or more processors to:
receive, from a panoptic segmentation network, panoptic segmentation predictions, the panoptic segmentation network receiving a 3D point cloud as input and outputting the panoptic segmentation predictions, wherein the panoptic segmentation predictions including one or a combination of an instance mask providing locations of each instance, a center density map, instance center offset or a sematic probability map that encodes probabilities of semantic classes for each location;
receive, from an object detection network having a plurality of layers, intermediate feature maps from one or more early layers of the object detection network, the object detection network receiving the 3D point cloud as input and outputting feature maps at each layer;
retrieve feature vectors from the intermediate feature maps using the panoptic segmentation predictions; and
combine the retrieved feature vectors with feature maps from one or more late layers of the object detection network for generating object detection predictions.

* * * * *